United States Patent
Hoff et al.

(10) Patent No.: US 11,801,619 B2
(45) Date of Patent: Oct. 31, 2023

(54) RAPID TOOLING LAYUP MANDREL

(71) Applicant: The Boeing Company, Chicago, IL (US)

(72) Inventors: Brad Alf Hoff, Auburn, WA (US); Abraham L. Shryock, Seattle, WA (US); Donald John Sutkus, Jr., Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/494,620

(22) Filed: Oct. 5, 2021

(65) Prior Publication Data
US 2023/0105890 A1    Apr. 6, 2023

(51) Int. Cl.
*B29C 33/48*    (2006.01)
*B29C 70/34*    (2006.01)

(52) U.S. Cl.
CPC .......... *B29C 33/485* (2013.01); *B29C 70/342* (2013.01)

(58) Field of Classification Search
CPC . B29C 33/0088; B29C 33/301; B29C 33/302; B29C 33/305
See application file for complete search history.

(56) References Cited

U.S. PATENT DOCUMENTS

| | | | | |
|---|---|---|---|---|
| 1,904,674 A * | 4/1933 | Rlumenthal | ......... | A63H 27/001 33/567 |
| 2,374,894 A * | 5/1945 | Pioch | ........................ | B64F 5/10 29/466 |
| 2,705,375 A * | 4/1955 | Ozenne | .................... | G01B 11/00 33/645 |
| 2,895,224 A * | 7/1959 | Jones | ..................... | F16B 11/006 403/189 |
| 3,039,912 A * | 6/1962 | Genetti | ............... | B29C 33/3842 156/298 |
| 3,161,555 A * | 12/1964 | Kish | ................... | B29C 33/3842 264/227 |
| 3,282,761 A * | 11/1966 | Evangelist | ............ | B29C 70/865 428/116 |
| 4,267,147 A * | 5/1981 | Pogoda | ................... | B29C 33/40 264/120 |
| 4,545,102 A * | 10/1985 | Grabos | .................. | B23Q 35/44 33/562 |
| 4,578,303 A * | 3/1986 | Kundinger | ................ | B32B 5/26 428/912.2 |
| 4,882,118 A * | 11/1989 | Megarry | ................. | B29C 70/44 425/389 |

(Continued)

FOREIGN PATENT DOCUMENTS

EP    0197709 A3    10/1989

OTHER PUBLICATIONS

Extended European Search Report dated Jan. 16, 2023 for European Application No. 22180998.1.

*Primary Examiner* — Matthew J Daniels
(74) *Attorney, Agent, or Firm* — GATES & COOPER LLP

(57) ABSTRACT

A layup mandrel including a rib structure comprising ribs defining a lofted surface; and a skin attached to and supported by the rib structure. The skin has a surface having a curvature of the lofted surface; the ribs are disposed to at least partially shape the curvature molding a part pressed against the surface during curing of the part; and the part comprises or consists essentially of a composite material.

19 Claims, 19 Drawing Sheets

(56) References Cited

U.S. PATENT DOCUMENTS

| | | | | |
|---|---|---|---|---|
| 4,894,903 A * | 1/1990 | Woods | ............... | B64F 5/10 |
| | | | | 29/559 |
| 5,100,255 A * | 3/1992 | Rule | ............... | F16B 7/00 |
| | | | | 403/267 |
| 8,480,823 B1 * | 7/2013 | Matsen | ............... | B29C 70/54 |
| | | | | 148/692 |
| 9,649,784 B2 * | 5/2017 | Masini | ............... | B29C 45/02 |
| 10,035,230 B2 * | 7/2018 | Buckus | ............... | B23Q 3/088 |
| 11,040,467 B1 * | 6/2021 | Poirier | ............... | B29C 70/46 |
| 2003/0091679 A1 * | 5/2003 | Aramburu | ............... | B29C 33/26 |
| | | | | 425/384 |
| 2007/0107189 A1 * | 5/2007 | Prichard | ............... | B29C 70/30 |
| | | | | 29/448 |
| 2009/0035412 A1 * | 2/2009 | Sobcinski | ............... | B29C 33/307 |
| | | | | 425/389 |
| 2009/0236044 A1 * | 9/2009 | Gallana Blanco | ............... | B29C 70/44 |
| | | | | 156/349 |
| 2012/0097333 A1 * | 4/2012 | Mironov | ............... | B29C 33/308 |
| | | | | 156/349 |
| 2012/0133066 A1 * | 5/2012 | Sanz Pascula | ............... | B29C 33/0011 |
| | | | | 425/150 |
| 2014/0084514 A1 * | 3/2014 | Hardwicke | ............... | B29C 33/306 |
| | | | | 425/383 |
| 2014/0345789 A1 * | 11/2014 | Eichler | ............... | B29C 70/021 |
| | | | | 156/212 |
| 2017/0225362 A1 * | 8/2017 | Anthony | ............... | B29C 70/542 |
| 2017/0239849 A1 * | 8/2017 | Grall | ............... | B29C 33/302 |
| 2018/0056611 A1 * | 3/2018 | Gintert | ............... | B29C 70/342 |
| 2018/0236638 A1 * | 8/2018 | Olberg | ............... | B25H 1/02 |
| 2021/0387295 A1 * | 12/2021 | Henrichsen | ............... | B29D 99/0028 |

\* cited by examiner

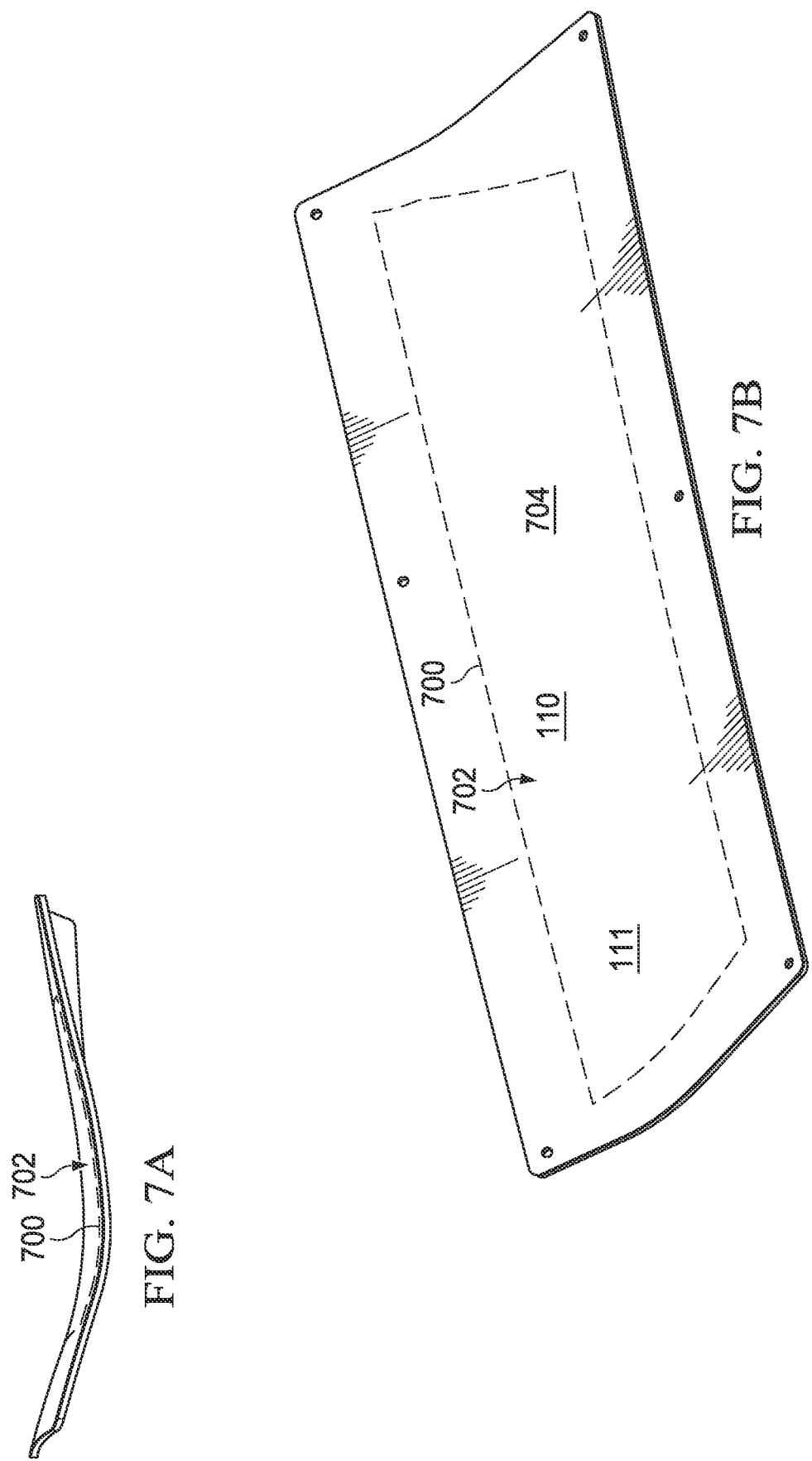

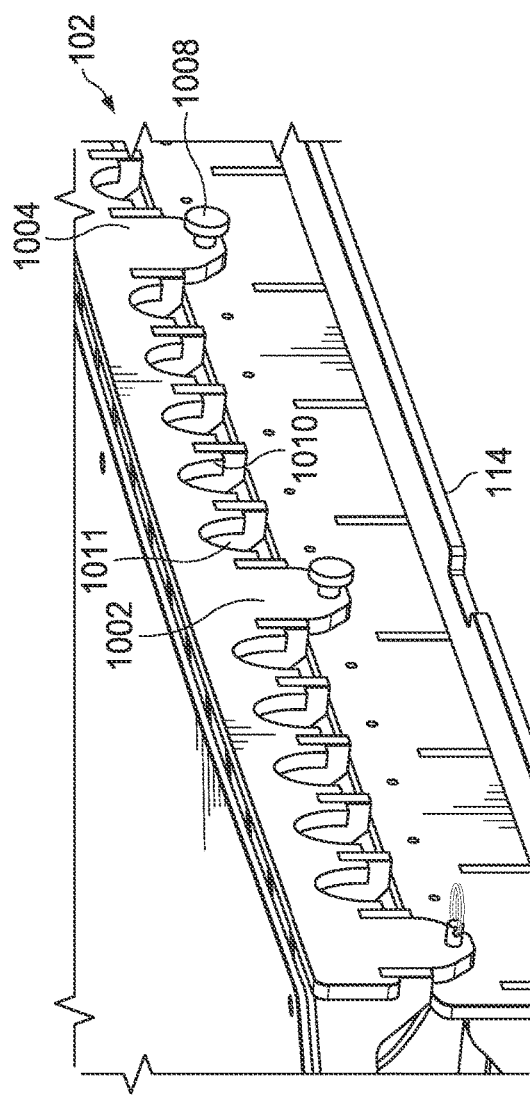
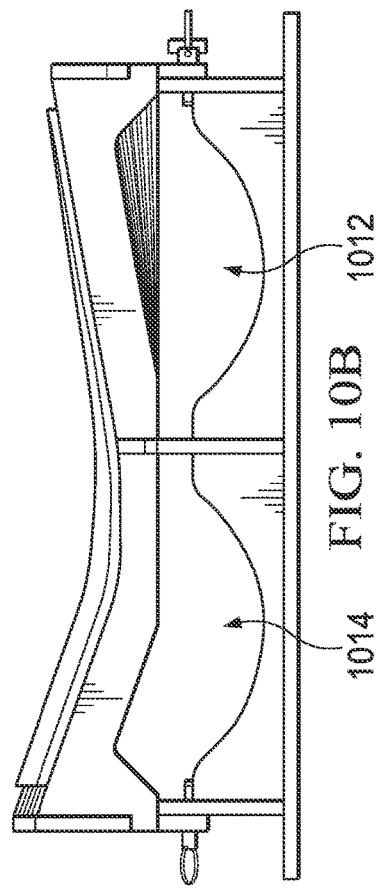
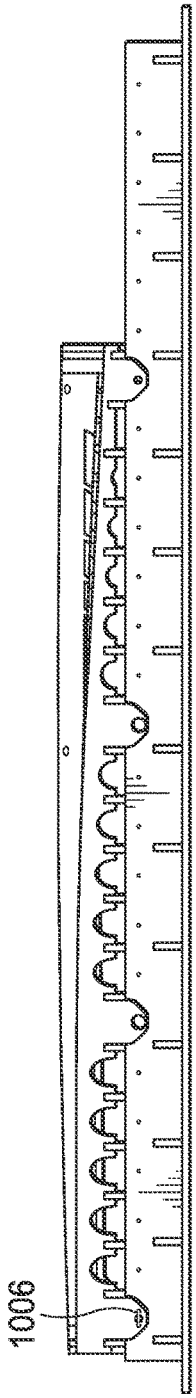
FIG. 10A
FIG. 10B
FIG. 10C

RAPID TOOLING LAYUP MANDREL

BACKGROUND

1. Field

The present disclosure relates to systems and methods for manufacturing composite parts.

2. Description of the Related Art

Conventional processes for manufacturing a layup mandrel require designing a dedicated substructure specific for the layup mandrel, creating a face sheet (the surface molding the final part shape), attaching all the components together with adhesives and complex assembly (wet layups, fasteners, or welding). Manufacturing a composite face sheet requires machining a master mold, layup and cure of the face sheet, and then final machining to match the desired contour of the part being molded. A metal face sheet typically requires purchasing a large amount of raw material which is then removed using lengthy machining operations to achieve the final shape of the metal face sheet. What is needed, then, are improved methods and systems for manufacturing a layup mandrel. The present disclosure satisfies this need.

SUMMARY

Illustrative, non-exclusive examples of inventive subject matter according to the present disclosure are described in the following enumerated paragraphs:

1. A layup mandrel, comprising:
a rib structure comprising ribs defining a lofted surface; and
a skin attached to and supported by the rib structure, wherein:
the skin has a surface having a curvature of the lofted surface;
the ribs are disposed to at least partially shape the curvature molding a part pressed against the skin during curing of the part; and
the part comprises or consists essentially of a composite material.

2. The layup mandrel of claim 1, further comprising a base comprising an assembly jig holding the ribs during assembly of the rib structure.

3. The layup mandrel of claim 1, further comprising a base comprising movable vanes for positioning and holding the ribs during assembly of the rib structure, wherein the base is modular for assembly of different configurations of the ribs.

4. The layup mandrel of claim 1, further comprising a detachable base comprising one or more handles for transporting or handling the layup mandrel attached to the detachable base.

5. The layup mandrel of claim 4, wherein the handles comprise one or more openings capable of receiving at least one tool selected from:
one or more forklift forks,
one or more lifting hooks, or
one or more attachments for connecting one or more casters,
so that the detachable base is capable of being at least lifted or transported by the tool when the tool or a the one or more attachments are inserted into the openings.

6. The layup mandrel of claim 4, wherein the rib structure comprises tabs forming joints with the detachable base.

7. The layup mandrel of claim 1, wherein the rib structure comprises or consists essentially of the composite material.

8. The layup mandrel of claim 1, wherein the skin is non-porous so that the skin has vacuum integrity when the skin is sealed to a bagging film so as to form a bag containing the part, the vacuum integrity maintaining a vacuum in the bag used for pressing the part against the skin during curing of the composite material.

9. The layup mandrel of claim 1, wherein the rib structure comprises a frame supporting the ribs and the frame comprises openings allowing airflow under the skin for increasing heat transfer during the curing.

10. The layup mandrel of claim 1, wherein the part comprises a face sheet and the face sheet is bonded to the surface so that the rib structure comprises an integrated stiffener for the face sheet.

11. The layup mandrel of claim 1, further comprising a face sheet on the skin, wherein the face sheet has a surface having the curvature of the lofted surface; wherein the curvature molds the part comprising an aircraft part pressed against the face sheet during curing of the part.

12. The layup mandrel of claim 11, wherein the surface comprises a machined surface.

13. The layup mandrel of claim 11, wherein the face sheet includes bushings or locators.

14. The layup mandrel of claim 1, wherein:
the rib structure comprises a frame supporting the ribs,
the ribs comprise faces and edges,
the faces comprise cross-sectional surfaces of the rib structure,
the edges define the lofted surface, and
the skin is disposed on the edges.

15. The layup mandrel of claim 1, wherein the rib structure comprises a notch holding a block having a block surface including a contour with higher resolution for molding a section of the part.

16. A method of laying up a face sheet, comprising:
obtaining a base comprising an assembly jig;
assembling a plurality of ribs in a frame on the base, so as to form a rib structure, wherein the ribs comprise faces and edges, the faces comprise cross-sectional surfaces of the rib structure, and the edges define a lofted surface;
bonding a skin to the edges so that the skin has a surface shaped by the edges and a curvature of the lofted surface;
laying up a face sheet comprising a composite material on the surface so as to at least partially mold the face sheet against the skin;
curing the face sheet against the skin, comprising:
sealing a bagging film to the skin so as to form an air-tight bag containing the face sheet; and
evacuating the bag so as to apply a pressure pressing the face sheet against the surface and finish molding of the face sheet against the skin.

17. The method of claim 16, further comprising:
laying up a part on the face sheet so as to at least partially mold the part against the face sheet;
curing the part, comprising:
sealing the bagging film to the face sheet so as to form the air-tight bag containing the part; and
evacuating the bag so as to apply the pressure pressing the part against the face sheet and finish molding the part against the face sheet.

18. The method of claim 17, further comprising machining a surface of the face sheet using only one machining step to form a machined surface, the pressure pressing the part against the machined surface during the molding.

19. The method of claim 16, further comprising cutting a plurality of the ribs from one or more panels comprising the composite material, wherein each of the ribs have one of the faces and one of the edges shaped to form the lofted surface.

20. The method of claim 16, further comprising detaching the base and re-using the base to assemble another one of the layup mandrels.

BRIEF DESCRIPTION OF THE DRAWINGS

FIG. 7A and FIG. 7B illustrate machining of the face sheet, wherein FIG. 7A is a cross-sectional view and FIG. 7B is a perspective view.

FIG. 10A is a perspective view of an example layup mandrel including the face sheet; FIG. 10B is a cross-sectional view of the example layup mandrel; and FIG. 10C is a longitudinal cross-sectional view of the example layup mandrel.

FIGS. 11A-11C illustrate selecting a conventional layup mandrel as a base for another layup mandrel, wherein FIG. 11A illustrates the conventional lay up mandrel, FIG. 11B illustrates assembling a rib structure; and FIG. 11C illustrates positioning the rib structure on a base comprising the conventional layup mandrel.

FIGS. 12A-12B illustrate a layup mandrel according to another example, wherein FIG. 12A is a perspective view and FIG. 12B is a cross-sectional view.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
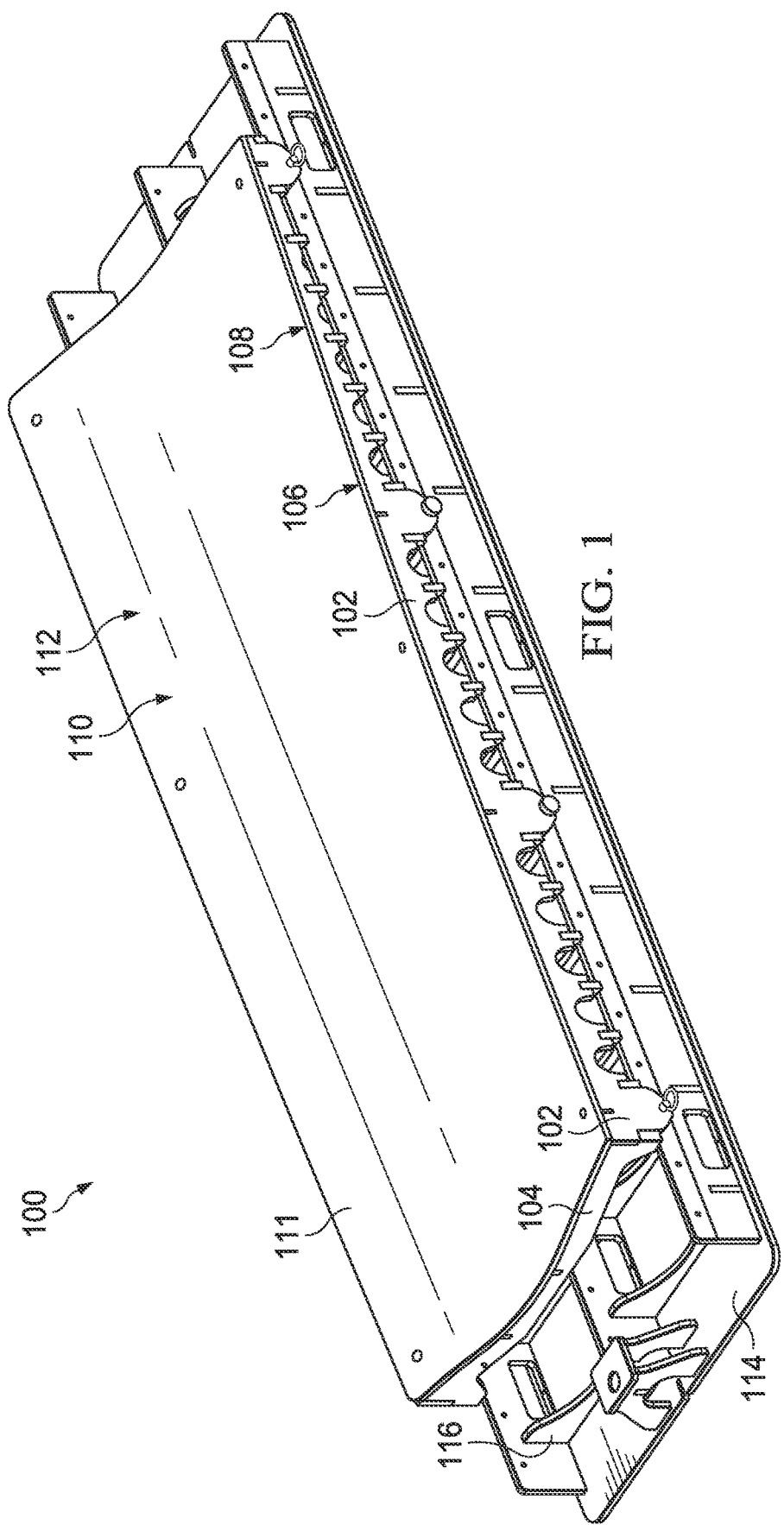
FIG. 1 illustrates a layup mandrel according to one or more examples described herein.

FIG. 1 illustrates a layup mandrel 100 (e.g., rapid tooling layup mandrel) comprising a rib structure 102 comprising ribs 104 defining a lofted surface 106; a skin 108 attached to and supported by the rib structure 102; and a face sheet 111 on the skin 108. The face sheet 111 has a surface 110 having a curvature 112 defined by the lofted surface 106 so that the mandrel 100 shapes a part pressed against the surface 110 during curing of the part. In the example of FIG. 1, the layup mandrel 100 further comprises a base 114 comprising an assembly jig 116 holding the ribs 104 during assembly of the rib structure 102.

Figure 2:
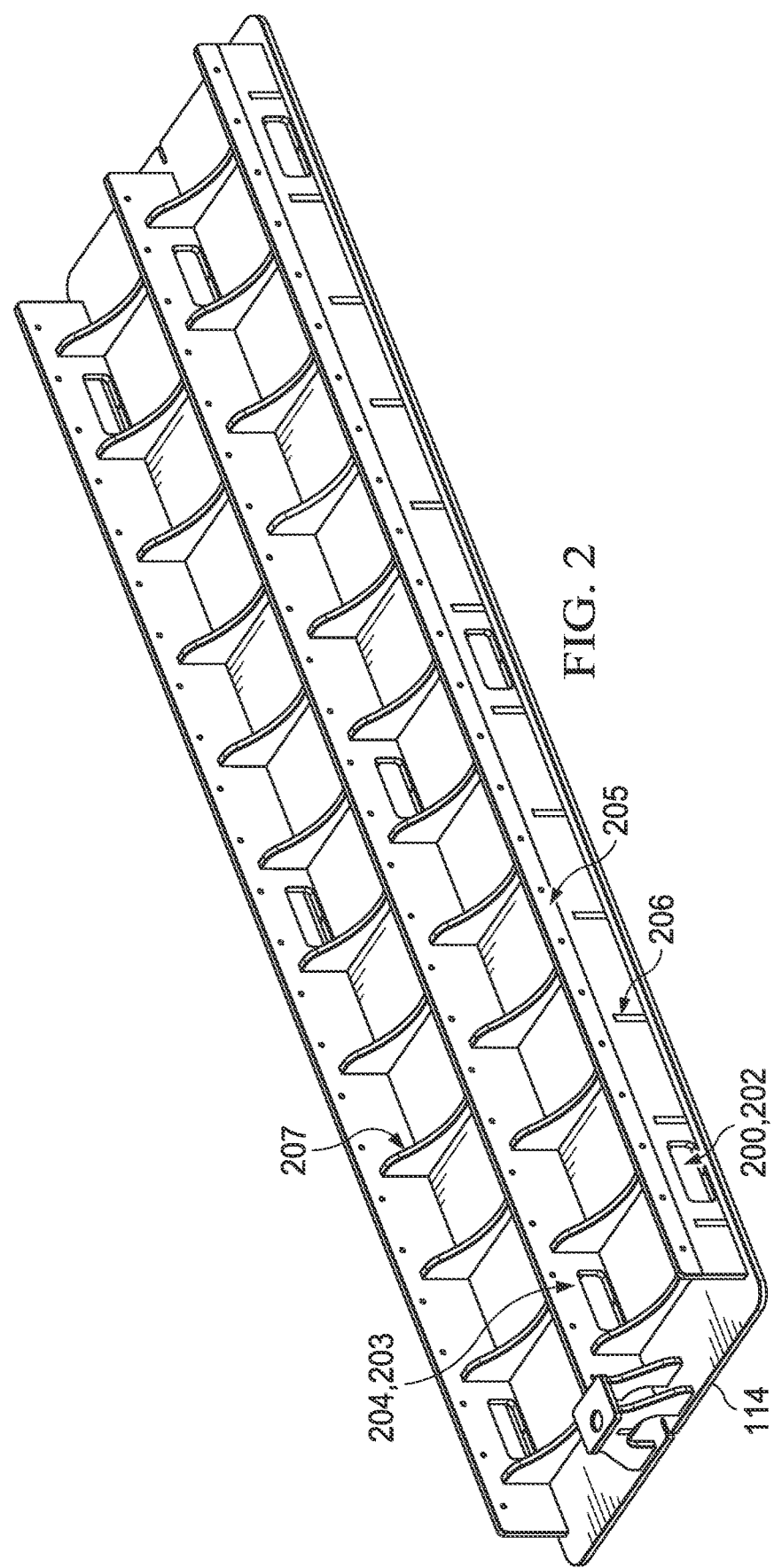
FIG. 2 illustrates an example detachable base for handling the layup mandrel.

FIG. 2 illustrates the base 114 further includes handles 200 (e.g., grips or tool handling structures) for handling and lifting the layup mandrel 100 attached to the base 114. The handles 200 or tool handling structures comprise one or more openings 202 capable of receiving at least one tool selected from one or more forklift forks, one or more lifting hooks, or one or more attachments for connecting casters so that the base 114 is capable of being at least lifted or transported by the tool (e.g., using a fork lift, a crane, or the casters).

FIG. 2 further illustrates an example assembly jig 116 comprises supports 203 (e.g., jigs or vanes 204) wherein the supports 203 comprise mounts positioning and holding the ribs 104 during the assembly of the rib structure 102. In this way, the base is modular for assembly of different configurations of the ribs 104. The supports 203 (e.g., vanes or mounts) run the length of the base 114 and have the attach holes 205 and/or slots 206 for positioning and mounting pieces 207. In one example, the pieces 207 that run across the width of the base 114 (along the shorter direction) are stiffeners to keep the base 114 flat and provide the base 114 its structural integrity.

Example Method of Fabrication

FIGS. 3A-3F illustrate a method of making a layup mandrel and molding a part.

Figure 3A:
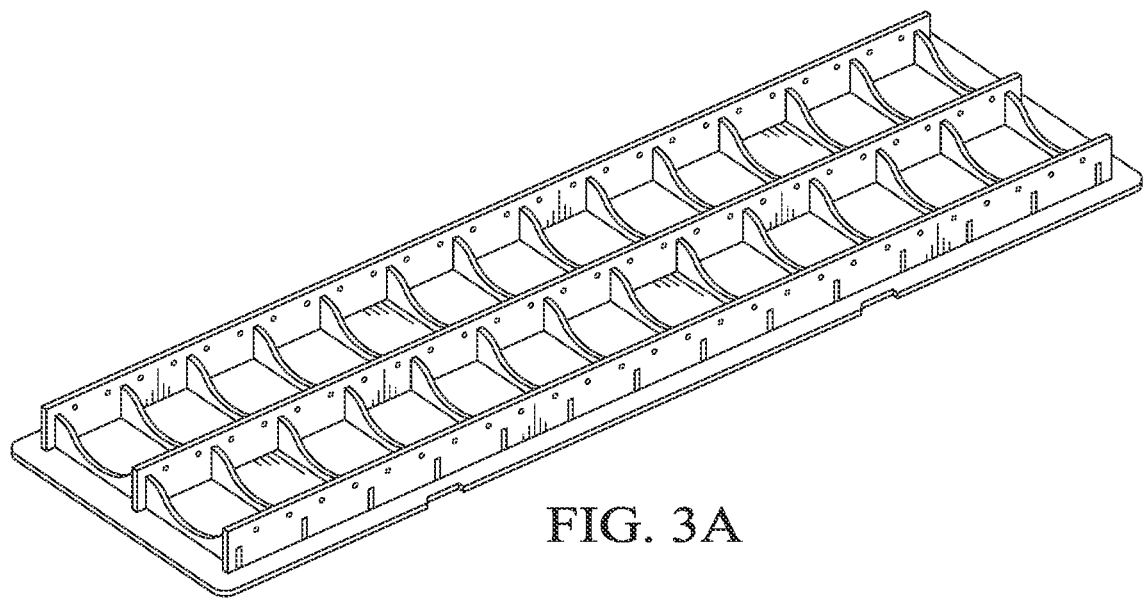
FIGS. 3A-3F illustrate an example method of making a layup mandrel and molding a part, comprising obtaining a base (FIG. 3A), assembling the rib structure on the base (FIG. 3B); disposing a skin on the rib structure (FIG. 3C); laying and curing a face sheet on the skin (FIG. 3D); machining the face sheet (FIG. 3E); and molding the part (FIG. 3F).

FIG. 3A illustrates obtaining a base of the correct size to build the layup mandrel. In one or more examples, the base is configured for building or stacking up a plurality of different layup mandrels.

Figure 3B:
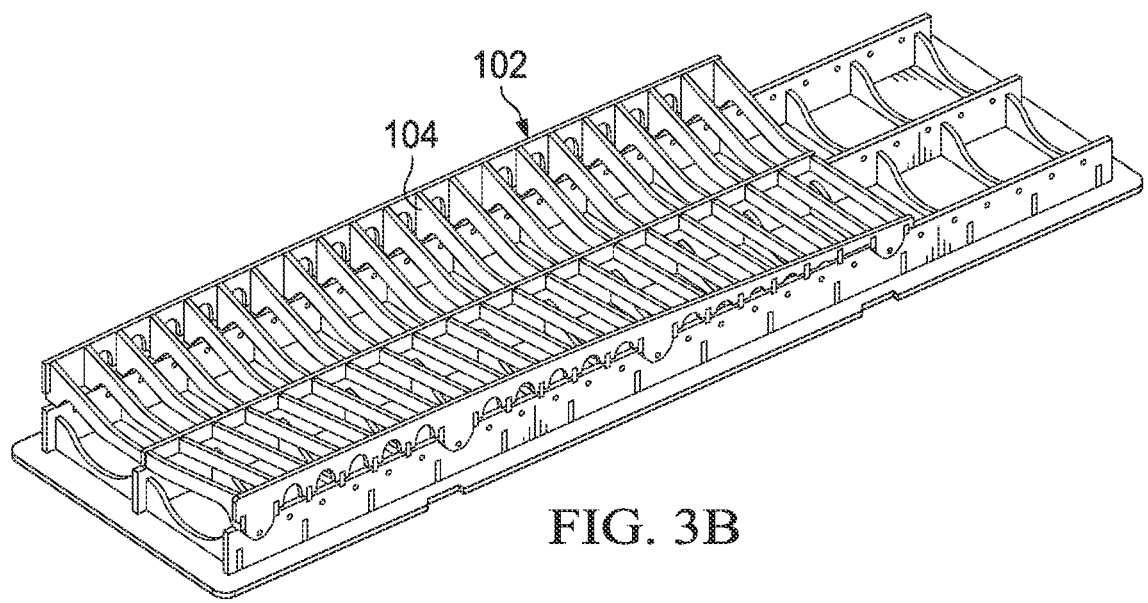

FIG. 3B illustrates bonding a set of ribs together using the base as an assembly jig, so as to form the set of ribs into a rib structure. In one or more examples, the ribs are made of the same composite material (e.g., carbon fiber, fiberglass) as the part being molded using the layup mandrel.

Figure 3C:
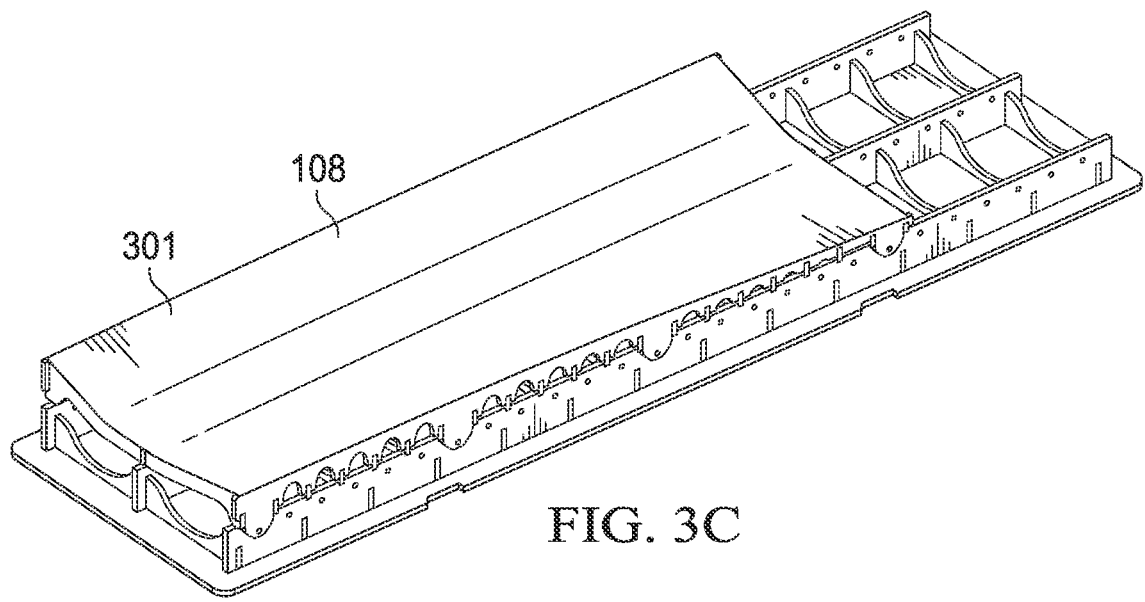

FIG. 3C illustrates bonding a skin (e.g., loft skin) to the rib structure, so as to create a shape for the face sheet comprising the layup mandrel tool surface. In one or more examples, the skin is stretched over and then bonded under tension to the rib structure to form a drum-like surface.

In one or more examples, the skin is made of one or more different laminates depending on the application requirements. In one or more examples, the skin comprises one or more materials having full vacuum integrity, allowing the face sheet to be bagged to the loft skin during curing of the face sheet under vacuum conditions. In this way, if using an autoclave, the layup mandrel is in an "equalized" pressure environment and the rib structure is not exposed to the autoclave pressure during curing (eliminating the need to design the rib structure to withstand large pressure differentials without collapse).

Example materials for the skin include, but are not limited to, a material that bonds well to the rib structure and ultimately the face sheet. Example properties of the skin include, but are not limited to, the skin having at least one of a stiffness, durability, and an ability to withstand extreme temperatures, e.g., to match different application requirements. In one or more examples, the stiffness, durability and ability to withstand extreme temperatures are tailored by selection of the one or more different materials and/or thickness of the skin. In yet further examples, the loft skin comprises a mesh enabling three dimensional printing or additive manufacturing of the face sheet.

Figure 3D:
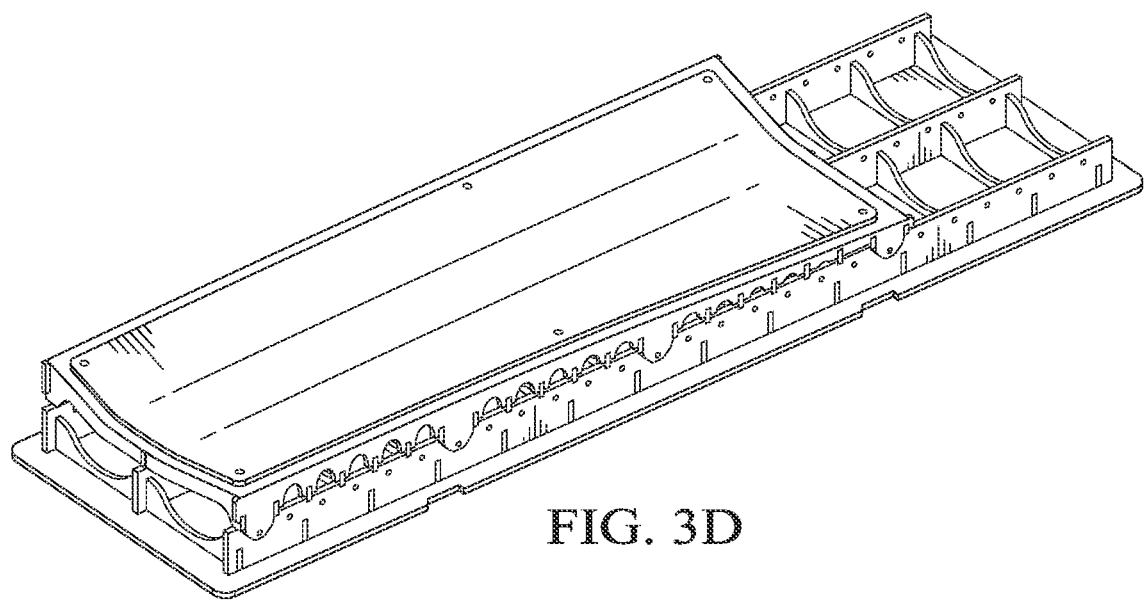

FIG. 3D illustrates laying up the face sheet on a surface 301 of the skin 108, vacuum bagging the face sheet to the loft skin and then curing the face sheet (e.g., at a temperature in a range from room temperature up to more than 700 degrees Celsius) if using an autoclave when the face sheet is vacuum sealed within the bag. In one or more examples, the face sheet comprises a composite material. Example composite materials include, but are not limited to, fiber (e.g., carbon fiber) reinforced epoxy resin (e.g., BMI resin) and thermoplastic. Example face sheet layup methods include, but are not limited to, the face sheet being laid up by hand or using automatic fiber placement. The cured face sheet includes features or functionality used during layup mandrel builds (e.g., scribes, optical tooling points, pad-ups, or drill starts). Examples of optical tooling points include, but are not limited to, a tooling ball (e.g., steel sphere) having a stem that slips into a hole in the layup mandrel and allowing the tooling ball to be probed so as to locate the tooling ball.

Example molding conditions for the face sheet include, but are not limited to, conditions wherein the rib structure and the skin (in combination) mold the face sheet during a curing process.

Figure 3E:
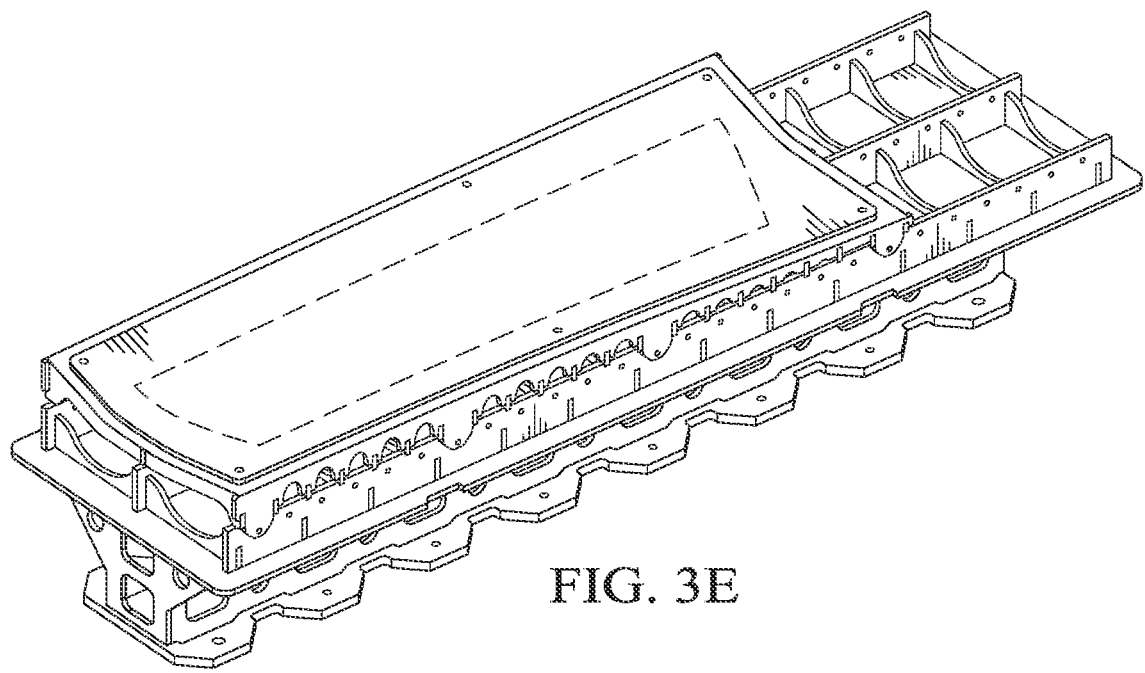

FIG. 3E illustrates after curing, optionally machining (e.g., computer numerical control, or CNC milling), finishing, or smoothing the surface of the face sheet (comprising the surface of the layup mandrel) to obtain a final contour shape of the layup mandrel.

Figure 3F:
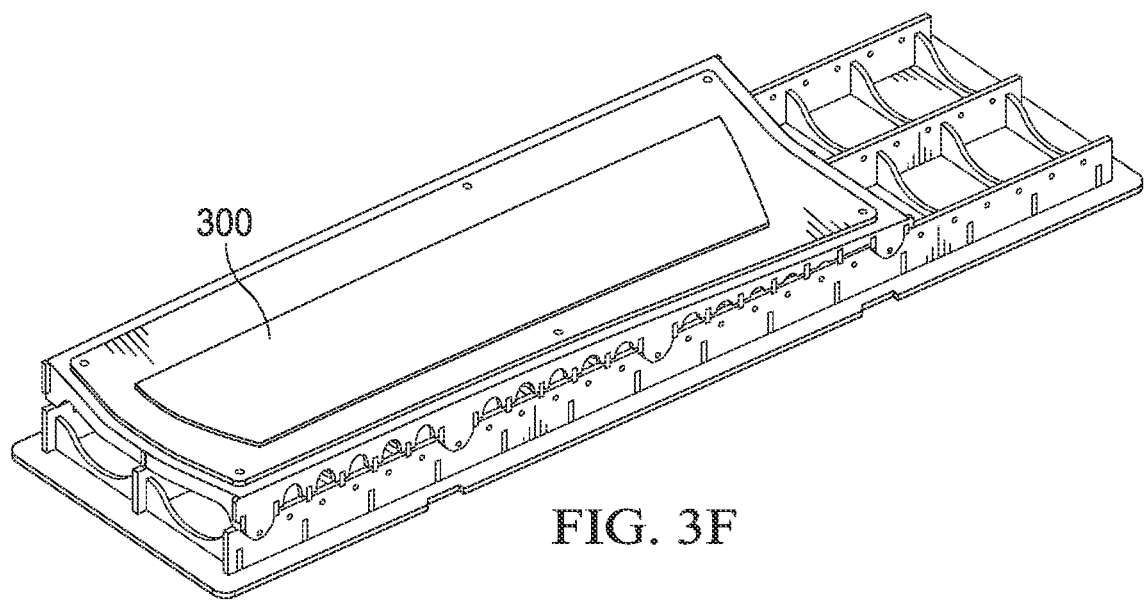

FIG. 3F illustrates using the layup mandrel to produce (mold) the part 300 against the face sheet. At this point the use of the base is optional. In one or more examples the base is removed prior to molding the part.

In one or more examples, the curing temperature depends on the material being used for the face sheet and/or part. Example curing temperatures are listed in the table below.

| Material | Curing Temperature |
| --- | --- |
| Tooling paste | Room temperature |
| Fiberglass | 250° |
| Carbon Fiber with epoxy resin | 350°-450° C. (450° C. when resin is BMI resin |
| Thermoplastic materials | 700°+ |

In General, layup mandrel tools are designed to account for stresses resulting from the different coefficient of thermal expansion (CTE) and contraction between different components during high temperature curing. Embodiments described herein fabricate the rib structure, the face sheet, and the part being molded by the layup mandrel with the same materials to ensure CTE compatibility between the layup mandrel and the part. In one or more examples, the skin does not need to be manufactured with the same material as the rib structure, part, or face sheet because the thickness of the skin is so thin that its CTE does not significantly impact the contraction and expansion of the layup mandrel.

Example Layup Mandrel Structures and Assemblies

Figure 4:
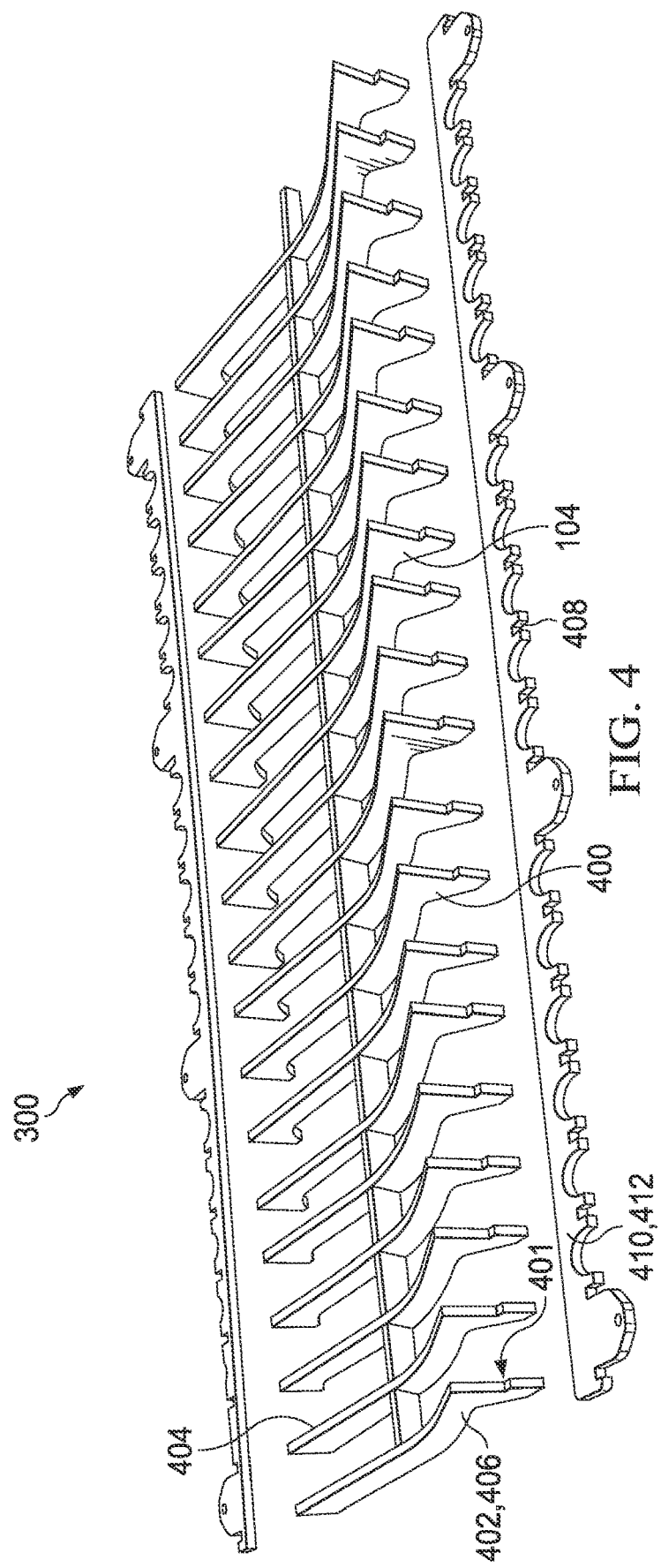
FIG. 4 illustrates an example assembly of the rib structure.

FIG. 4 illustrates an example wherein the ribs 104 are slats 400 cut from a large stock panel using water jet cutting. To facilitate fast fabrication, each rib 104, including ribs 104 having a different shape, have a notch 401 for identifying the ordering of the ribs 104 during the assembly. The ribs 104 comprise faces 402 and edges 404, the faces 402 comprise cross-sectional surfaces 406 of the rib structure, and the edges 404 define the lofted surface 106. Each notch 401 is inserted into and held in a corresponding slot 408 in a rail 410 so as to form the rib structure 102 comprising a set of ribs 104 secured in a frame 412. In one or more examples, the plan (including the shape, dimensions, and nesting) of the ribs 104 is generated using a profile automatically generated according to a design required by a customer. Example design methods include, but are not limited to, the plan of each of the ribs being automatically designed using relations in computer aided design (CAD) without coding or scripting.

Figure 5:
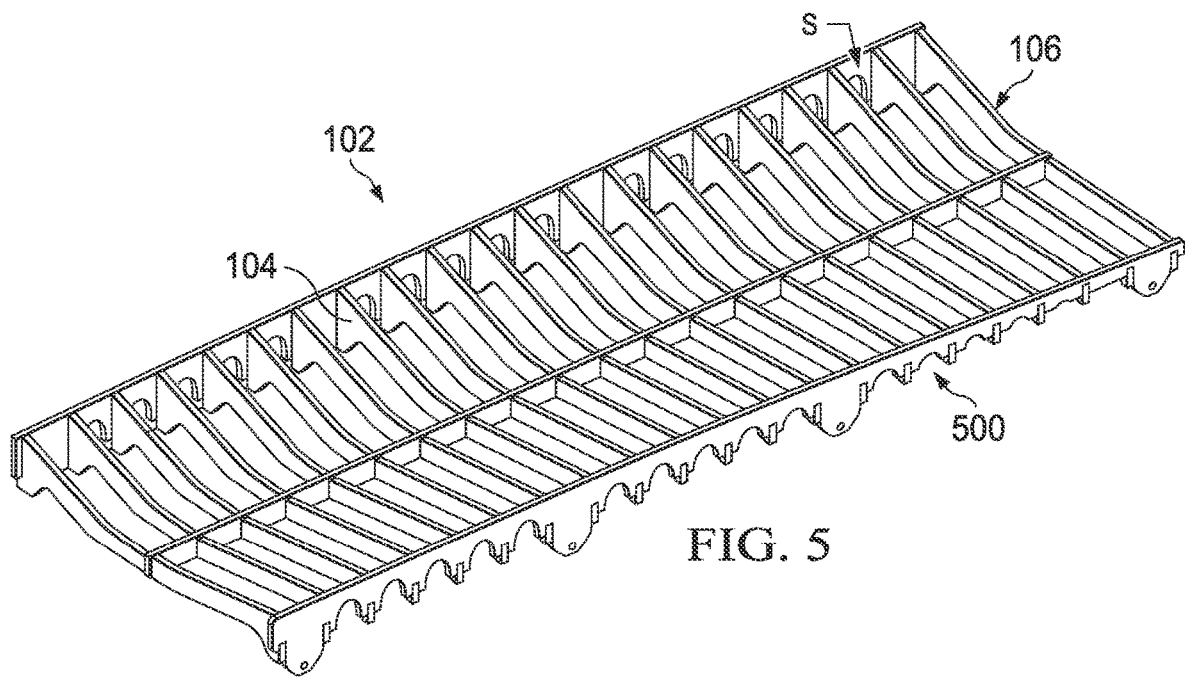
FIG. 5 illustrates an example rib structure.

FIG. 5 illustrates a set of ribs 104 assembled into a rib structure 102 creating the lofted surface 106 defining a rough shape for the face sheet. The spacing S of the ribs, frequency, and pattern are designed to optimally support the desired curvature and surface profile resolution of the part being molded. In one or more examples, in areas requiring higher contour, the spacing between the ribs is decreased for higher resolution. Example spacings include a spacing S in a range of 1-10 inches.

Figure 6:
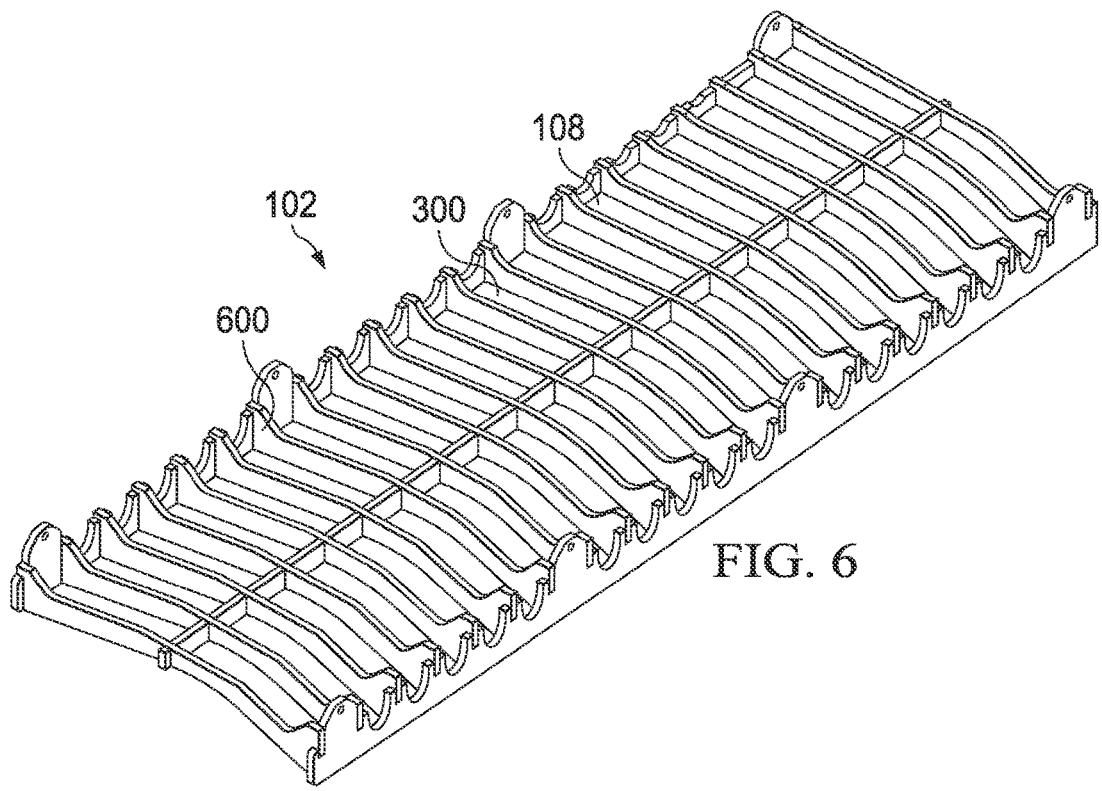
FIG. 6 illustrates an example rib structure permanently bonded to the skin, wherein the rib structure comprises an integrated stiffener.

FIG. 6 illustrates the rib structure 102 permanently bonded to the skin 108, so that after the face sheet is cured on the skin 108, the rib structure 102 comprises an integrated stiffener 600 for the skin 108 and the face sheet.

FIG. 7A-7B illustrate machining of the face sheet 111 along a trajectory 700 that consumes any error in the contour of the surface 110 of the face sheet 111 (as defined or formed by the skin on the rib structure), thereby forming a machined surface 702.

Figure 8B:
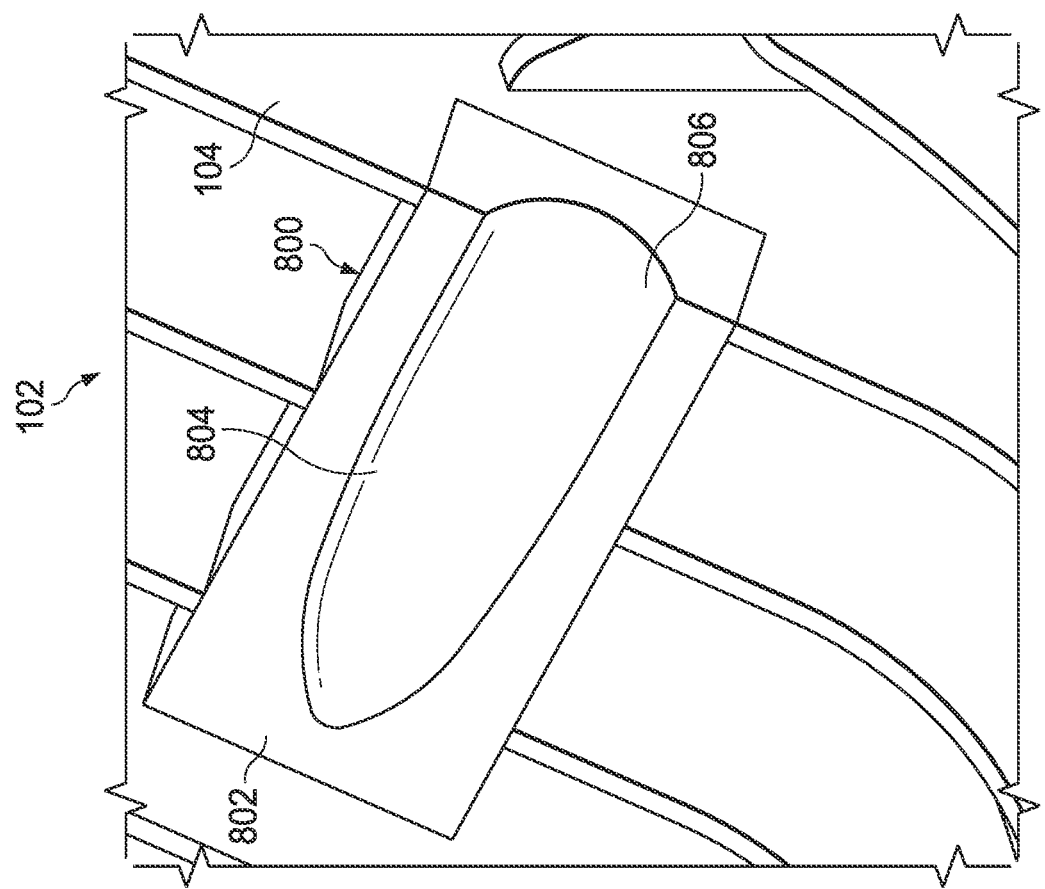
FIG. 8B illustrates the block held in a notch in the rib structure.
Figure 8A:
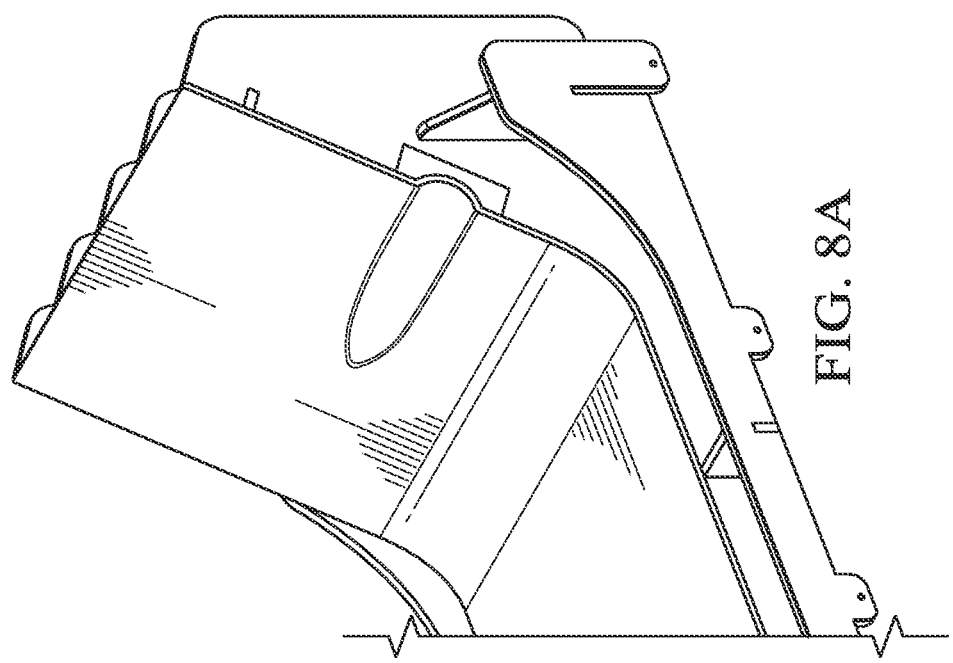
FIG. 8A illustrates a face sheet molded using a block in the rib structure having a higher resolution.

FIGS. 8A-8B illustrate an example rib structure 102 including a notch 800 comprising an area for holding or mounting a block 802 having a block surface 804. The block surface 804 comprises a contour 806 having more highly detailed area for molding a region of the face sheet with higher resolution. In one or more examples, the block 802 (e.g., molding block) comprises a carbon foam or other molded or machined materials.

Figure 9A:
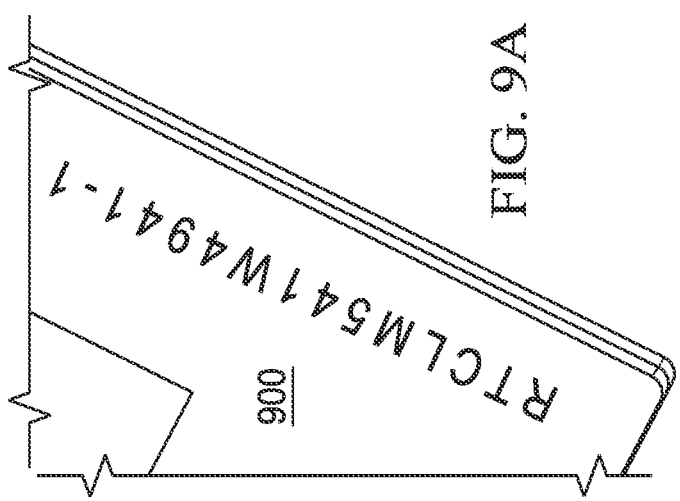
FIG. 9A illustrates additional features in the face sheet for forming additional functionality such as locators.
Figure 9B:
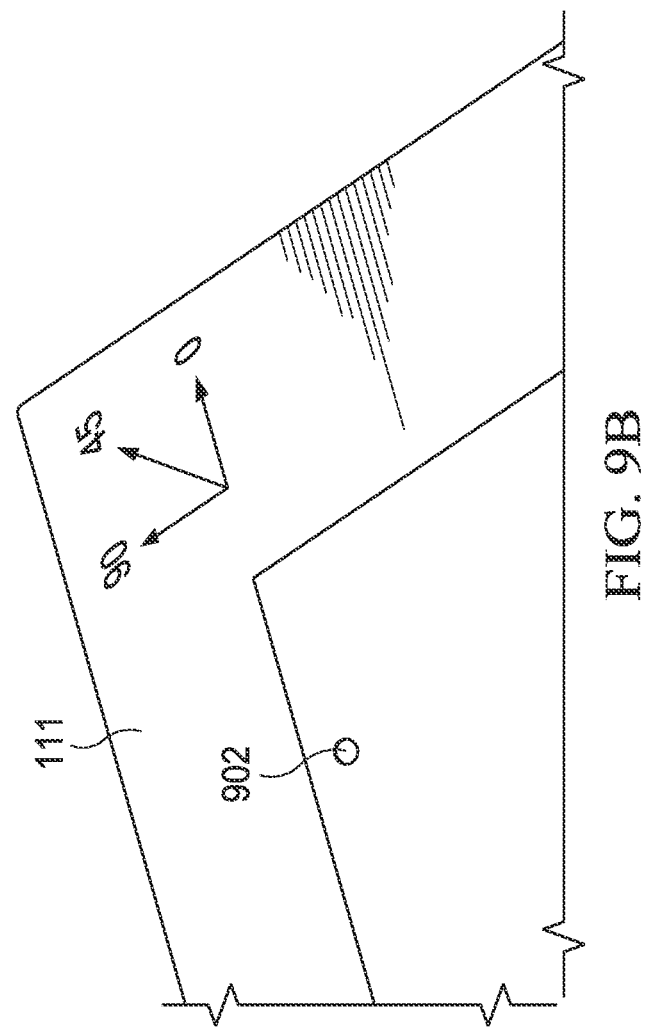
FIG. 9B illustrates a spot for a tool ball for orienting a ply orientation of the part to the layup mandrel when laying up the part.

FIG. 9 illustrates an example face sheet 111 including plies 900, wherein one or more of the plies 900 include functionality, e.g., bushings or locators for locating the face sheet during machining operations, or a spot 902 for a tool ball used for face sheet or part positioning.

FIGS. 10A-10C illustrate an example wherein the rib structure 102 comprises joints 1002 (e.g., finger joints) comprising tabs 1004. The tabs 1004 comprise holes 1006 for fasteners 1008 (e.g., pins or screws), wherein the fasteners 1008 are used to fasten the rib structure 102 to the base 114 along the length of the rib structure 102 and along a cross-section of the rib structure 102. The rib structure 102 further includes curved concave sections 1010 defining openings 1011 that increase airflow 1012 under the rib structure. The airflow 1012 facilitates heat transfer during the molding process. The curing typically, but not always, requires heating the material to cure temperature. In one or more examples, the cure also generates heat which may need removed. In some examples, the airflow is maintained at cure temperature and transfers heat to or from the part during cure to keep the part at the proper temperature. A cavity 1014 defined between the rib structure 102 and the base 114 is used for channeling the airflow 1012. In other examples, the cavity 1014 and concave sections 1010 are formed entirely in the base 114.

Figure 11A:
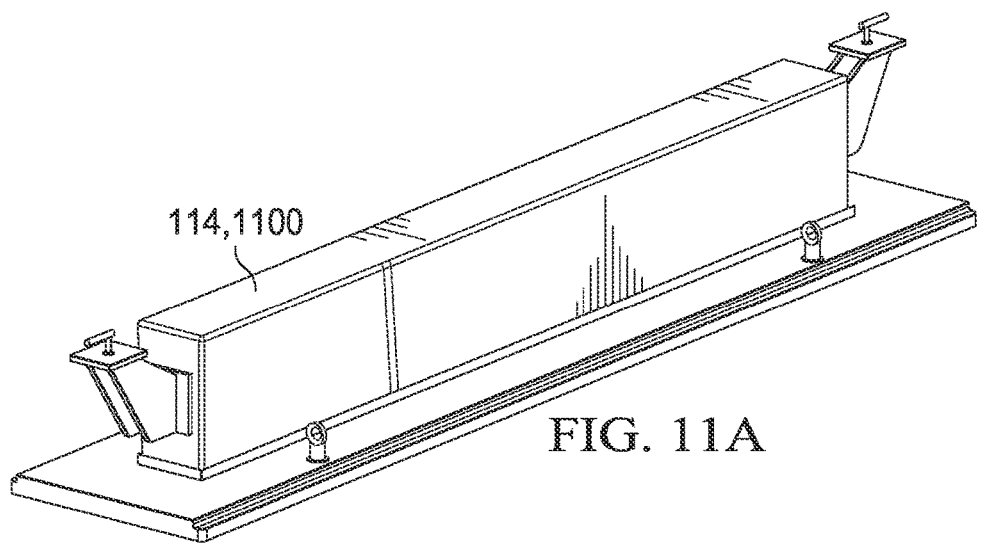
Figure 11B:
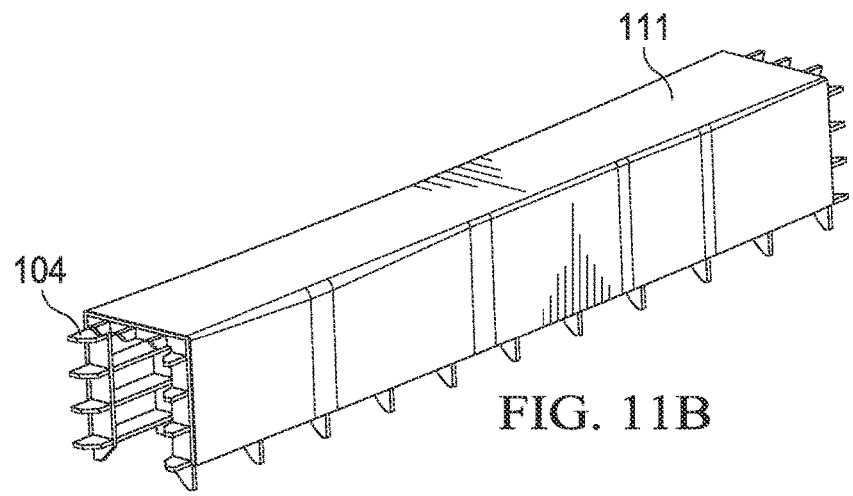
Figure 11C:
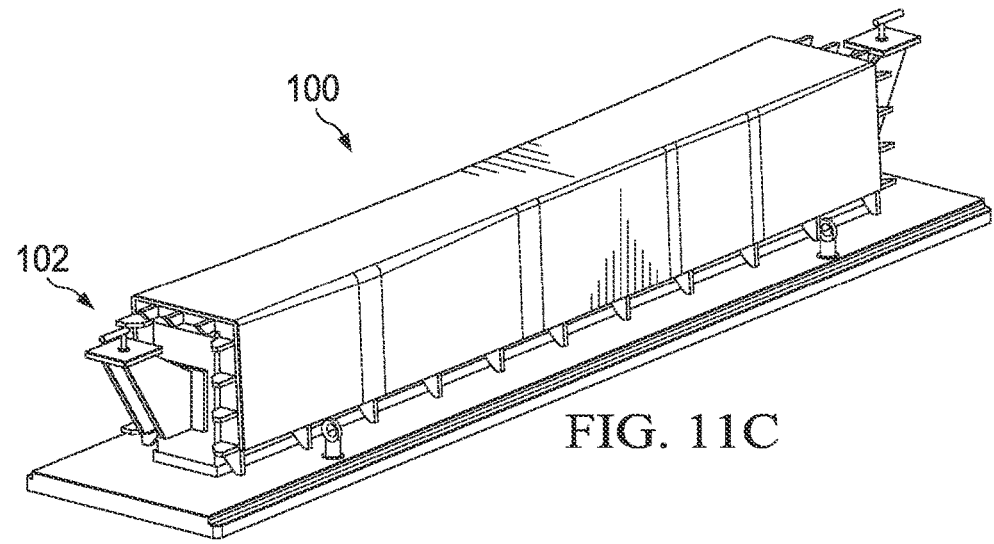

FIGS. 11A-11C illustrate re-purposing a conventional layup mandrel as a base 114 for another layup mandrel 100 comprising a rib structure 102; the skin; and the face sheet 111.

Figure 12A:
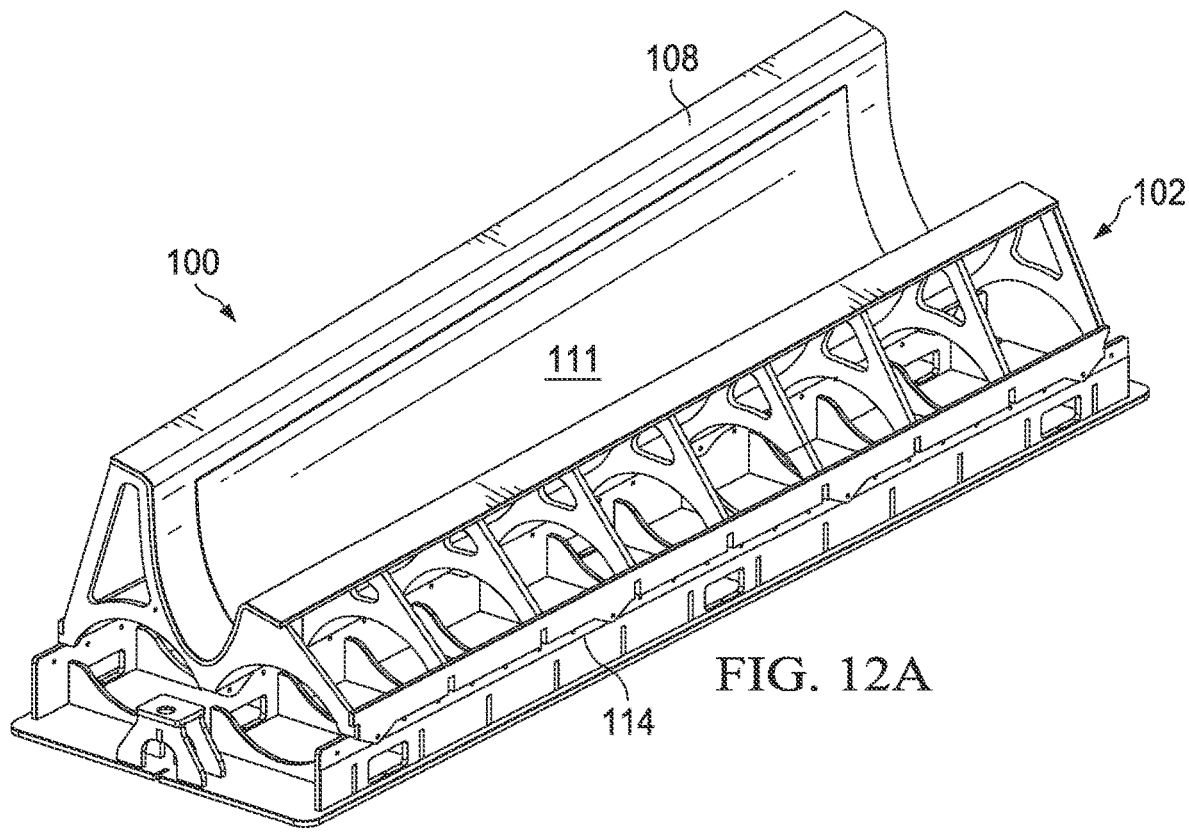
Figure 12B:
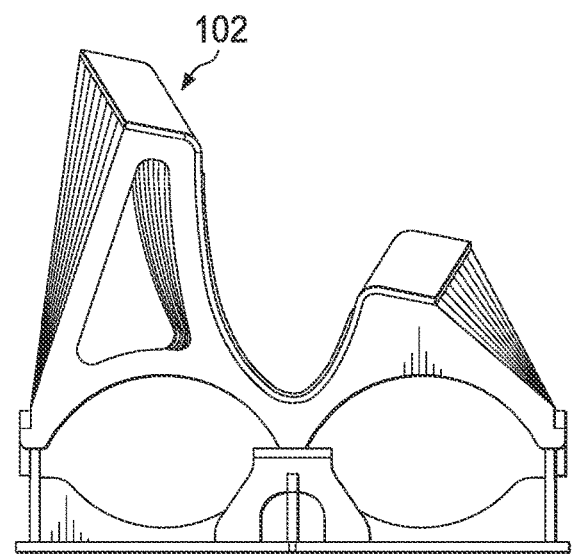

FIGS. 12A-12B illustrate a layup mandrel 100 having a shape configured to mold an aircraft part (e.g., a wing leading edge). The layup mandrel 100 comprises a rib structure 102 comprising female connectors for connecting to the base 114.

Example System and Method for Molding a Part Using the Layup Mandrel

Figure 13:
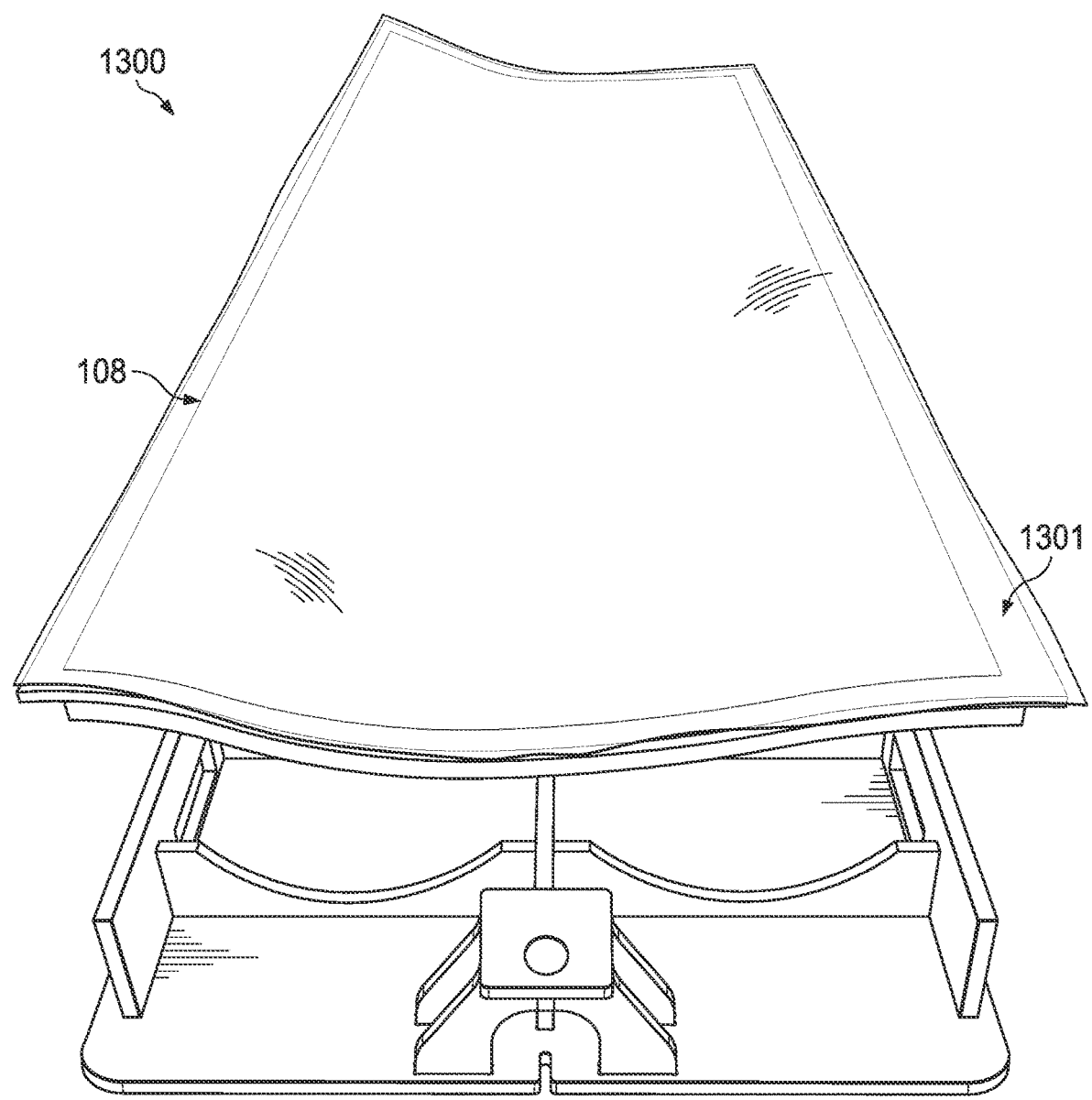
FIG. 13 is a top view of the layup mandrel showing a bagging film being used to seal the face sheet during curing of the face sheet.
Figure 14:
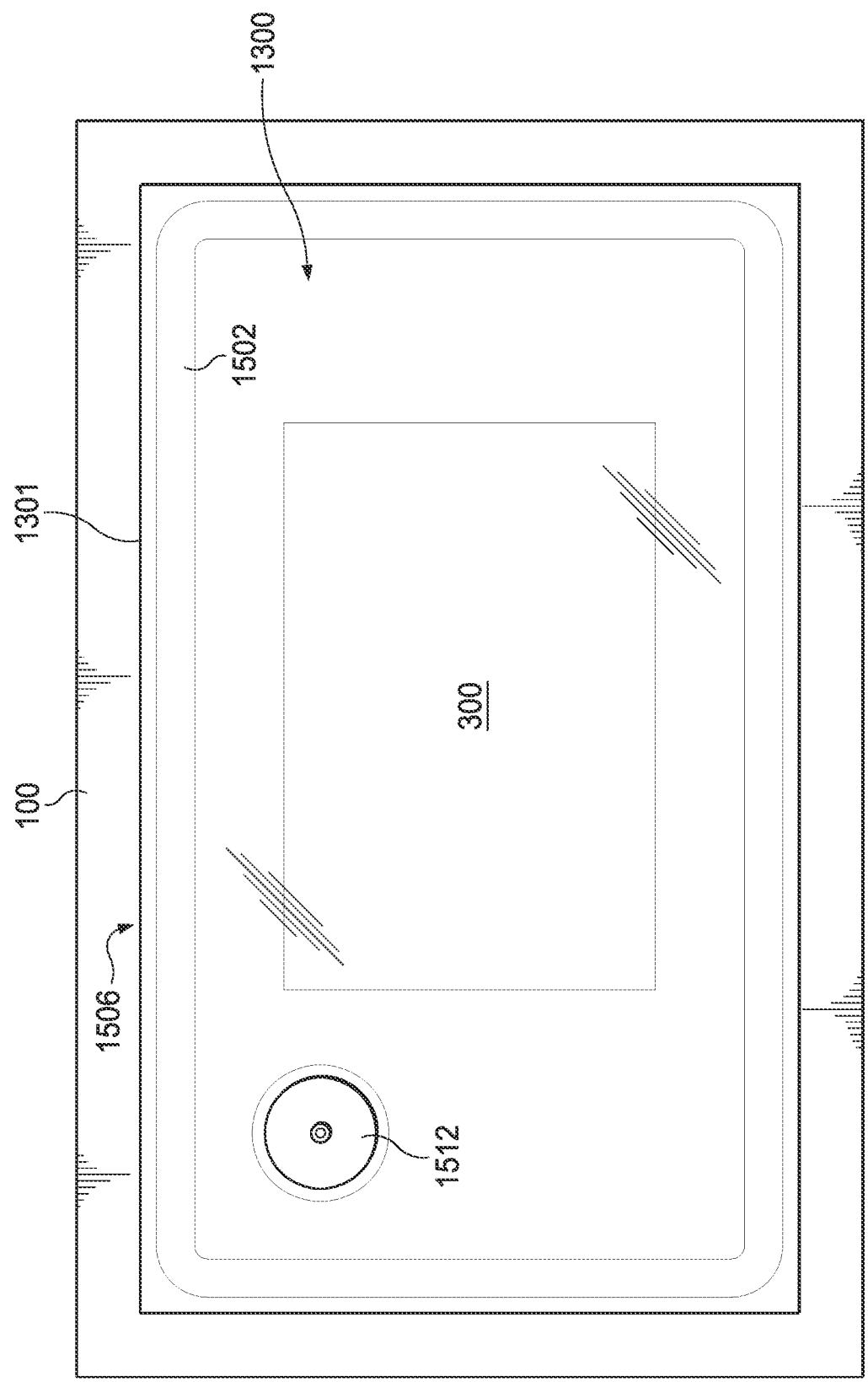
FIG. 14 is a top view of the layup mandrel showing a composite part placed on the face sheet.
Figure 15:
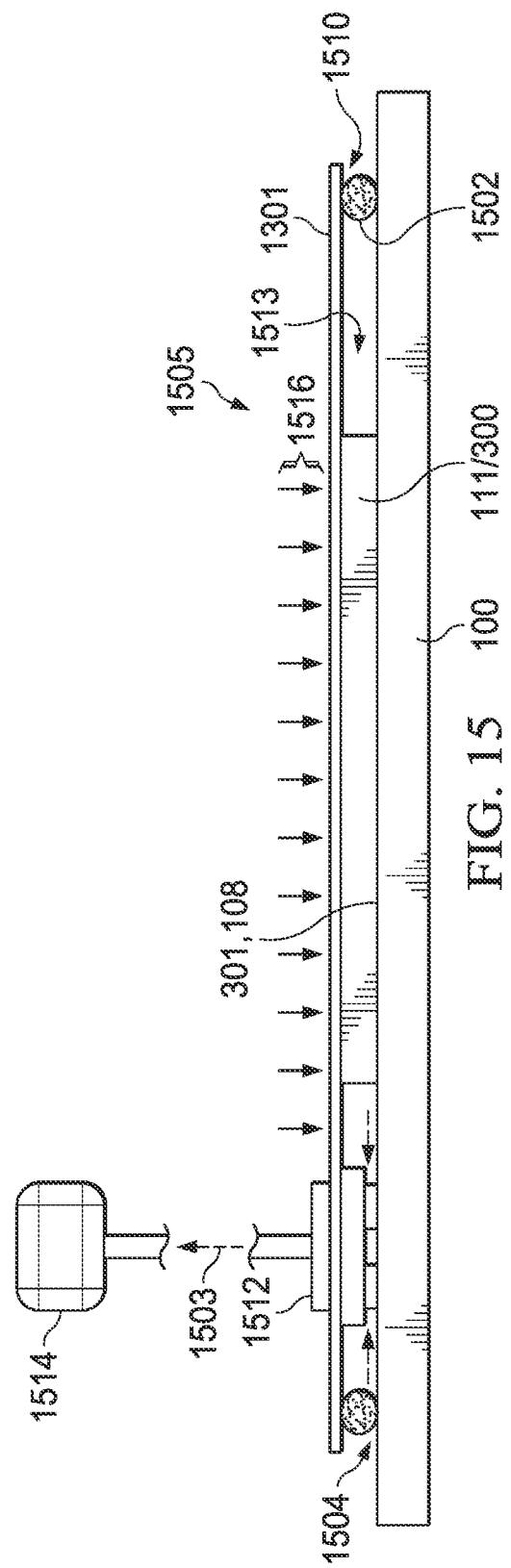
FIG. 15 is a side view of the layup mandrel being used to mold a part.

FIGS. 13, 14, and 15 illustrate a system 1300 and method for molding a part 300 using the layup mandrel 100. FIG. 13 is a perspective view illustrating a bagging film 1301 on the layup mandrel 100, wherein the bagging film 1301 is used to seal the part comprising a face sheet 111 during curing of the face sheet 111.

FIGS. 14 and 15 illustrate the system 1300 further comprises double sided adhesive 1502 (e.g., tacky tape), wherein a first side 1504 of the adhesive 1502 contacts the skin 108 and forms a continuous sealed border or perimeter 1506 around an entirety of the part 300. The bagging film 1301 is sealed to a second side 1510 of the double sided adhesive 1502 around the whole perimeter 1506, so as to form an airtight bag 1505 comprising the surface 301 of the skin 108, the double sided adhesive 1502, and the bagging film 1301.

FIGS. 14 and 15 further illustrate the system 1300 comprises a vacuum port 1512 allowing access to a sealed volume of the bag 1505 while maintaining vacuum integrity of the bag 1505 during the molding process. The system 1300 further comprises a vacuum pump 1514 connected to the vacuum port for sucking air 1503 from the bag 1505 via the vacuum port 1512, thereby evacuating the bag 1505 and forming a vacuum 1513 inside the bag 1505. During molding of the part 300 placed on the layup mandrel 100, atmospheric pressure 1516 outside the evacuated bag 1505 presses on the part 300 over an entire surface of the evacuated bag 1505, so as to press the part 300 against the layup mandrel 100 (and molding the part according to contour of the lofted surface 106). In one or more examples, the part 300 is pressed against the layup mandrel with a pressure, e.g., in a range from atmospheric pressure to 200 pounds per square inch (e.g., 90-100 pounds per square inch). The molding further comprises heating (e.g., at a temperature in a range of room temperature to more than 700 degrees Celsius) the part 300 so as to cure the part 300 while the part 300 is being molded using the pressure. In one or more examples, the part or face sheet is molded and cured in an autoclave. However, an autoclave is not necessary. In other examples, the part or face sheet are molded and cured under pressure (e.g., atmospheric pressure), e.g., subjected and applied using the evacuated bag 1505.

As described herein, in some examples, the part 300 being molded on the layup mandrel 100 comprises a face sheet 111 bonded to or attached to the skin 108 (so that the face sheet is molded against the skin 108). In further examples, after the face sheet is 111 molded on the layup mandrel 100, the layup mandrel 100 further comprising the face sheet 111 is used to mold another part 300 using the system 1300, so that the part 300 is now molded against the surface 110 of the face sheet 111. The contour of the surface 110, 301 is determined by the predetermined design of the lofted surface 106 and optionally also the finished profile of the surface 702 of the face sheet 111 (e.g., as formed by machining). In one more examples, only one machining operation is used to form or machine the surface 110 into the machined surface 702 against which the part 300 is molded.

Figure 16:
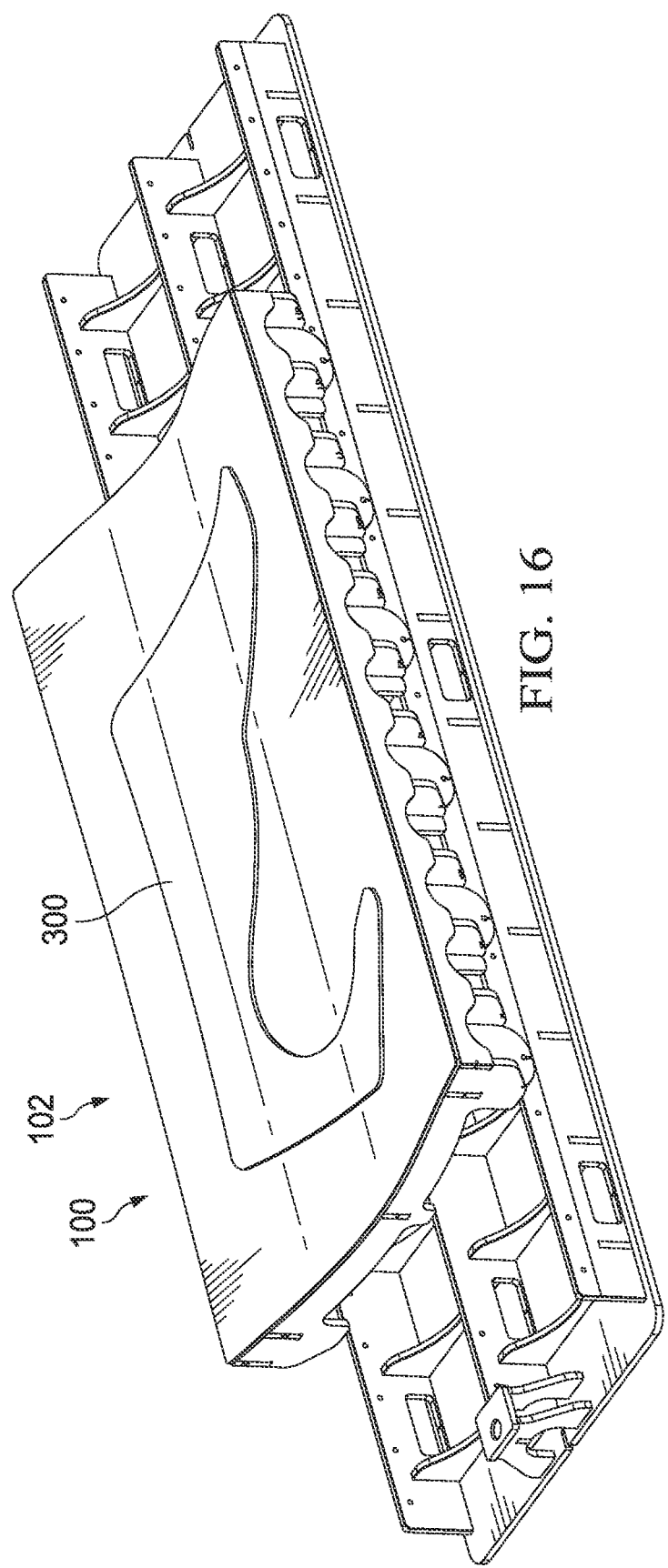
FIG. 16 illustrates a molded part molded on the layup mandrel.

FIG. 16 illustrates a part 300 molded using the layup mandrel 100.

Example Aircraft Parts Manufactured Using the Layup Mandrel

Figure 17:
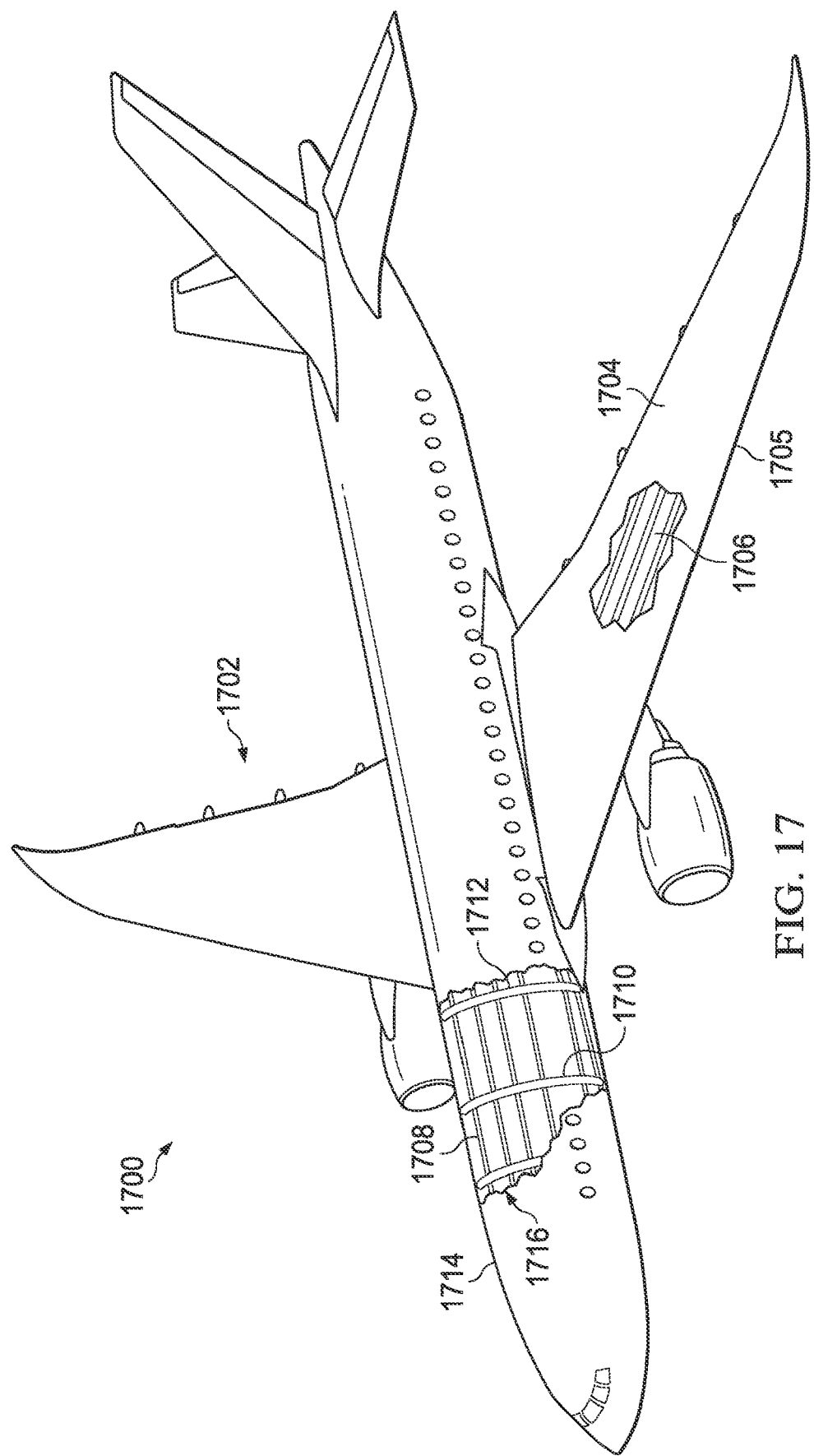
FIG. 17 illustrates an aircraft comprising parts manufacturable using a layup mandrel according to examples described herein.

FIG. 17 is a schematic of an aircraft 1700 comprising parts 300 comprising aircraft parts 1702 manufactured and moldable using the layup mandrel 100. FIG. 17 illustrates example aircraft parts 1702 include, but are not limited to, a wing skin 1704 (including wing leading edge 1705), a wing spar 1706, a longeron 1708, a bulkhead 1710, a fuselage section 1712, or fuselage skin 1714.

Example Process Flow Method

Figure 18:
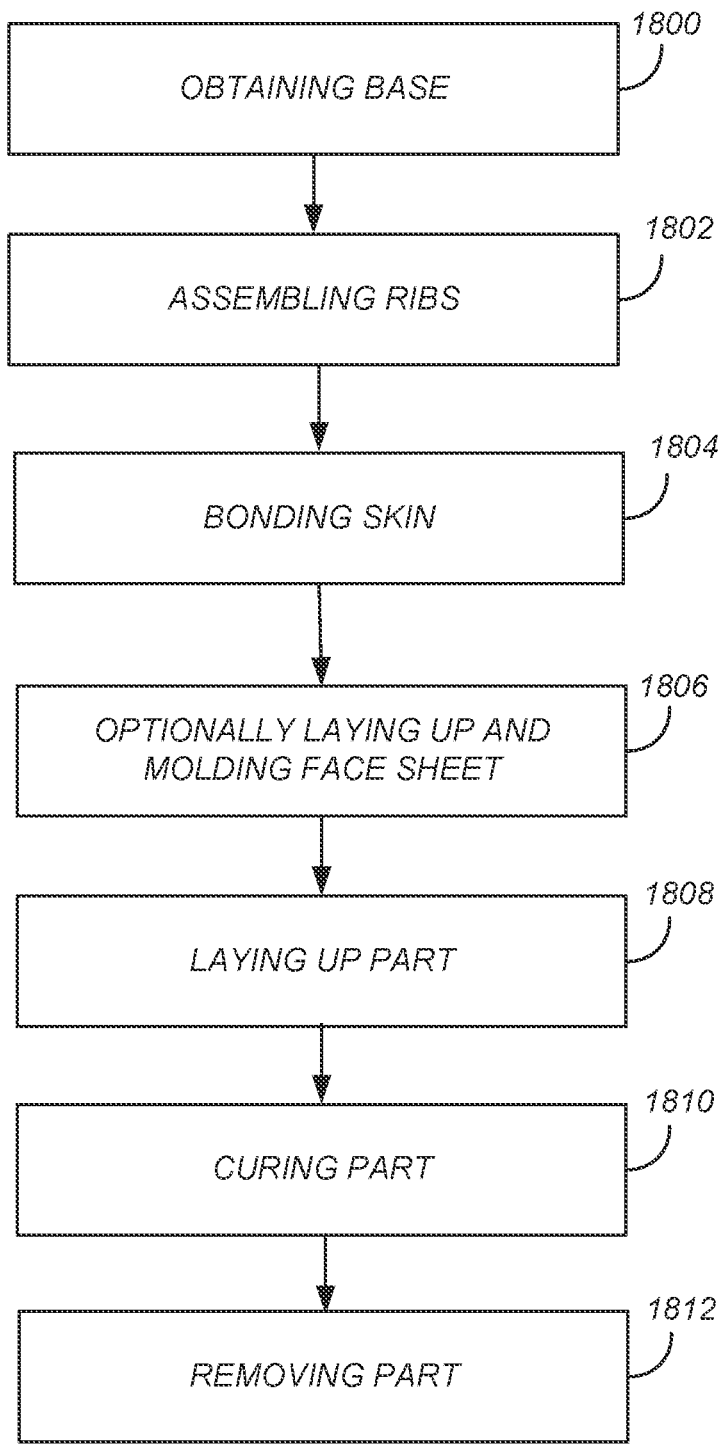
FIG. 18 is a flowchart illustrating a method of making a part.

FIG. 18 is a flowchart illustrating a method of laying up a face sheet, comprising the following steps.

Block 1800 represents obtaining a base comprising an assembly jig.

Block 1802 represents assembling a plurality of ribs in a mount on the base, so as to form a rib structure, wherein the ribs comprise faces and edges, the faces comprise cross-sectional surfaces of the rib structure, and the edges define a lofted surface, or obtaining the rib structure manufactured using this step;

Block 1804 represents bonding a skin to the edges so that the skin has a surface shaped by the edges and a curvature of the lofted surface, and optionally applying a mold release agent to the skin if no face sheet will be used (the mold release agent facilitates removal of the part from skin after molding). In one or more examples, the step comprises obtaining the rib structure combined with the skin using this step.

Block 1806 represents optionally laying up the face sheet comprising a composite material on the surface; and molding the face sheet against the skin with the mold release agent, comprising sealing a bagging film to the skin so as to form a bag containing the face sheet; evacuating the bag so as to apply a pressure pressing the face sheet against the surface; and curing the face sheet while the pressure is applied.

Block 1808 represents laying up a part on the face sheet or on a mold release agent on the skin, wherein the laying up at least partially molds the part to the face sheet or the skin.

Block 1810 represents curing the part, comprising sealing the bagging film to the face sheet or the skin so as to form the bag containing the part; evacuating the bag so as to apply pressure pressing the part against the face sheet or the skin with the mold release agent, so as to finish molding the part against the face sheet or the skin with the mold release agent Block 1812 removing the part from the skin or the face sheet.

Layup Mandrel and Method Embodiments

Illustrative, non-exclusive examples of inventive subject matter according to the present disclosure are described in the following enumerated paragraphs:

1. A layup mandrel (100), comprising:
a rib structure (102) comprising ribs (104) defining a lofted surface (106); and
a skin (108) attached to and supported by the rib structure (102), wherein:
the skin (108) has a surface (301) having a curvature (112) of the lofted surface (106);
the ribs (104) are disposed to at least partially shape the curvature (112) molding a part (300) pressed against the skin (108) during curing of the part (300) (e.g., using an autoclave); and
the part (300) comprises or consists essentially of a composite material.

2. A layup mandrel comprising an adjustable sub-structure, ribs, and a lofted skin which supports a composite face sheet laid up on the skin, wherein the sub-structure, the ribs, and the lofted skin are configured for production of composite parts in a reduced time frame (e.g. 10 days or less from start of manufacture of the layup mandrel) as compared to a conventional manufacturing process taking 2-6 months.

3. The layup mandrel of clause 1 or 2, wherein the sub-structure or base includes a floating, notched capture system that facilitates the speed of assembly of the ribs to the sub-structure or base.

4. The layup mandrel of any of the clauses 1-3, wherein the base or sub-substructure comprises adjustable or movable vanes configured to provide a preform shape ready to accept the ribs, e.g., in a short time period and so that the substructure is modular and re-useable.

5. The layup mandrel of clause 4, wherein the vanes are configured to capture the ribs such that the ribs are free to move independently, opening up a wide design space for selection of the material(s) used to manufacture both the substructure and the ribs.

6. The layup mandrel (100) of clause 1, further comprising a base (114) comprising an assembly jig (116) holding the ribs (104) during assembly of the rib structure (102).

7. The layup mandrel (100) of clause 1 or 6, further comprising a base (114) comprising vanes (204) for positioning and holding the ribs (104) during assembly of the rib structure (102), wherein the base (114) is modular for assembly of different configurations of the ribs (104).

8. The layup mandrel of any of the clauses 1-7, wherein the sub-structure or base comprises a universal egg crate type base system comprising adjustable vanes that move up or down to define a rough shape of the face sheet on the layup mandrel.

9. The layup mandrel of any of the clauses 1-8, wherein the substructure or base comprises tool handling features for coupling to a forklift, a crane, or other transport or handling vehicle.

10. The layup mandrel (100) of any of the clauses 1-9, further comprising a detachable base (114) comprising one or more handles (200) for transporting or handling the layup mandrel (100) attached to the detachable base (114).

11. The layup mandrel (100) of clause 10, wherein the handles comprise one or more openings (202) capable of receiving at least one tool selected from:
one or more forklift forks,
one or more lifting hooks, or
one or more attachments for connecting one or more casters,
so that the detachable base (114) is capable of being at least lifted or transported by the tool when the tool or a the one or more attachments are inserted into the openings (202).

13. The layup mandrel of any of the clauses 1-11, wherein handles are not included in the layup mandrel and the base has sufficient structural strength for safe transport of the layup mandrel, eliminating the need for the layup mandrel to include strengthening features designed for qualifying the layup mandrel for lifting loads.

14. The layup mandrel of any of the clauses 1-13, wherein the sub-structure or base is pre-qualified for a design load (e.g., a maximum known allowable load, thereby eliminating the need for recurring stress analysis).

15. The layup mandrel (100) of any of the clauses 1-14, wherein the rib structure (102) comprises tabs (1004) forming joints (1002) with the detachable base (114).

16. The mandrel (100) of any of the clauses, wherein the rib structure (102) comprises a mount (500) supporting the ribs (104) and the mount (500) comprises openings (1011) allowing airflow (1012) under the skin (108) for heat transfer (108) during the curing.

17. The mandrel (100) of any of the clauses 1-16, wherein:
the rib structure (102) comprises a mount (500) supporting the ribs (104),
the ribs (104) comprise faces (402) and edges (404),
the faces (402) comprise cross-sectional surfaces of the rib structure (102), and
the edges (404) define the lofted surface (106), and
the skin (108) is disposed on the edges (404).

18. The layup mandrel of any of the clauses 1-17, wherein a series of the ribs placed over the vanes define a lofted shape of a high resolution support surface comprising the skin (108).

19. The layup mandrel of any of the clauses 4, 5 and 7-8, wherein the ribs comprise a two dimensional shape representing a cross sectional slice between the loft surface at its relative location and the vane interface it contacts.

20. The layup mandrel of any of the clauses 4-5, 7-8, or 19, wherein the ribs float on the vanes to account for thermal expansion differences with the sub-structure or base.

21. The layup mandrel of any of the clauses 4-5, 7-8, 19, or 20, wherein the ribs are captured at their ends by a cross rib and the cross rib is attached along edge vanes to facilitate assembly and/or disassembly of the ribs.

22. The layup mandrel of any of the clauses 1-21, wherein the ribs are cut to fit the preformed substructure or base and provide sufficiently high resolution necessary to support the face sheet and form the face sheet with the required surface definition to mold a part.

23. The layup mandrel of any of the clauses 1-22, wherein a spacing of the ribs and a low profile of the ribs are selected to reduce or minimize material consumption of consumable standard stock used to manufacture the ribs.

24. The mandrel (100) of any of the clauses 1-23, wherein the rib structure (102) comprises a notch (800) holding a block (802) (e.g., comprising carbon foam) having a block surface (804) including a contour (806) with higher resolution for molding a section of the part (300).

25. The layup mandrel of any of the clauses 1-24, wherein the ribs and face sheet are removed from the substructure or base for storage of the layup mandrel.

26. The layup mandrel of any of the clauses 1-25, comprising multiple substructures connected together to create a larger platform to support a larger face sheet.

27. The mandrel (100) of any of the clauses 1-26, further comprising a face sheet (111) bonded to a surface (301) of the skin (e.g., so that the rib structure (102) comprises an integrated stiffener (600) for the face sheet (111)), wherein the part (300) is molded against a surface (110) of the face sheet (111).

28. The layup mandrel of any of the clauses 1-27, wherein the skin or loft skin is material laid over the ribs and taking the shape of the ribs, and the skin or loft skin on the ribs supports the layup of the face sheet.

29. The layup mandrel of any of the clauses 1-28, wherein the skin conforms to shape of the ribs.

30. The layup mandrel of any of the clauses 1-29, wherein the skin is made of any material having the necessary forming requirements or characteristics enabling the skin to cover the ribs, take the lofted shape, and function as the surface which defines the face sheet.

31. The layup mandrel (100) of any of the clauses 1-30, wherein the skin (108) is non-porous so that the skin (108) has vacuum integrity when the skin (108) is sealed to a bagging film (1301) so as to form a bag (1505) containing the part, the vacuum integrity maintaining a vacuum used for pressing the part against the surface (110) during curing of the composite material using the autoclave.

32. The layup mandrel of any of the clauses 1-31, wherein the skin has vacuum integrity allowing the face sheet to be bagged to the skin.

33. The layup mandrel of any of the clauses 1-30, wherein the skin does not have vacuum integrity.

34. The layup mandrel of any of the clauses 1-34, wherein the skin comprises a laminate including multiple layers with different properties (e.g., mechanical or thermal properties).

35. The layup mandrel of any of the clauses 1-34, wherein the skin comprises structural layers modifying the stiffness and allowing different spacings of the ribs.

36. The layup mandrel of any of the clauses 1-35, wherein the skin comprises adhesive bonding layers for bonding the skin to the ribs.

37. The layup mandrel of any of the clauses 1-36, wherein the face sheet comprises a surface of the layup mandrel used to mold and define a geometry of the part.

The layup mandrel of any of the clauses 1-37 wherein the effects of material thermal expansion are reduced or eliminated by bonding the ribs to the skin comprising a thin skin (e.g., having a thickness from 0.003" to 0.050" thick depending on the lamination combination).

38. The layup mandrel of any of the clauses 1-38, wherein the ribs are bonded to the skin.

39. The layup mandrel of any of the clauses 1-39, wherein the ribs are bonded to the lofted skin and face sheet such that the ribs comprise structural stiffeners.

40. The layup mandrel of any of the clauses 1-38, wherein the ribs are not bonded to the lofted skin or face sheet.

41. The layup mandrel of any of the clauses 1-38, wherein the skin is mechanically attached to the rib structure.

42. The layup mandrel of any of the clauses 1-38, wherein the skin is not attached to the rib structure.

43. The layup mandrel of any of the clauses 1-38, wherein the ribs are attached to the base or the sub-structure so that the ribs and face sheet may be quickly removed and reattached to the sub-structure.

44. The layup mandrel (100) of any of the clauses 1-44, wherein the face sheet 111 or skin 108 comprises a machined surface (702).

45. The layup mandrel of any of the clauses 1-44, wherein the face sheet is created with adequate thickness to allow a single machining process to consume all error in the surface profile defined by the skin on the rib structure.

46. The layup mandrel of any of the clauses 1-46, wherein the face sheet is finished using only one machine operation or step.

47. The layup mandrel of any of the clauses 1-47, wherein the face sheet is made of any material that can be formed to match a desired shape of the part using the processing requirements or tolerances (e.g., temperature and pressure) for fabricating the part.

48. The layup mandrel (100) of any of the clauses, wherein the face sheet includes bushings or locators.

49. A process for shaping the face sheet (e.g., comprising or consisting essentially of a composite material) using the layup mandrel of any of the clauses 1-49.

50. The process of clause 50 wherein the face sheet is manufactured without a master mold for composite face sheet and without complex shaping of a metallic face sheet.

51. The layup mandrel (100) of any of the clauses 1-51, wherein the part (300) comprises an aircraft part, vehicle part, automobile part, boat part, sports equipment part (e.g., ski) or other consumer good.

52. The layup mandrel of any of the clauses, wherein, when the layup mandrel's life span is complete, the sub-structure or base is re-used for the assembly of another different layup mandrel (100)

53. A method of laying up a face sheet (111), comprising:
obtaining a base (114) comprising an assembly jig (116);
assembling a plurality of ribs (104) in a support or mount (500) (e.g., edge frame, capture plate, or rib support) on the base (114), so as to form a rib structure (102), wherein the ribs (104) comprise faces (402) and edges (404), the faces (402) comprise cross-sectional surfaces of the rib structure (102), and the edges (404) define a lofted surface (106);
bonding a skin (108) to the edges (404) so that the skin (108) has a surface (301) shaped by the edges (404) and a curvature (112) of the lofted surface (106);
laying up a face sheet (111) comprising a composite material on the surface (301), so as to at least partially mold the face sheet against the skin;
curing the face sheet (111) against the skin (108), comprising:
sealing a bagging film (1301) to the skin (108) so as to form a bag (1505) containing the face sheet (111); and
evacuating the bag (1505) so as to apply a pressure pressing the face sheet (111) against the surface (301) so as to finish molding of the face sheet (111) against the skin.

54. The method of clause 54, further comprising:
laying up a part (300) on the face sheet (111) so as to at least partially mold the part (300) against the face sheet (111);
curing the part (300), comprising:
sealing the bagging film (1301) to the face sheet (111) so as to form the bag (1505) containing the part (300); and
evacuating the bag (1505) so as to apply the pressure pressing the part (300) against the face sheet (111), so as to finish molding the part (300) against the face sheet (111).

55. The method of clause 54 or 55, further comprising machining a surface (110) of the face sheet (111) using only one machining step to form a machined surface (702), wherein the pressure presses the part (300) against the machined surface (702) during the molding.

56. A method of laying up a part (300), comprising:
obtaining a base (114) comprising an assembly jig (116);

assembling a plurality of ribs (104) in a mount (500) on the base (114), so as to form a rib structure (102), wherein the ribs (104) comprise faces (402) and edges (404), the faces (402) comprise cross-sectional surfaces of the rib structure (102), and the edges (404) define a lofted surface (106);

bonding a skin (108) to the edges (404) so that the skin (108) has a surface (301) shaped by the edges (404) and a curvature (112) of the lofted surface (106);

applying a mold release agent to the surface (301)

laying up the part (300) comprising a composite material on the mold release agent on the surface (301), so as to at least partially mold the part (300) against the skin;

curing the part (300) against the skin (108), comprising:
sealing a bagging film (1301) to the skin (108) so as to form a bag (1505) containing the part (300); and
evacuating the bag (1505) so as to apply a pressure pressing the part (300) against the surface (301) so as to finish molding of the part (300) against the skin.

57. The method of any of the clauses 54-56, further comprising cutting a plurality of the ribs (104) from one or more panels comprising the composite material, wherein each of the ribs (104) have one of the faces (402) and one of the edges (404) shaped to form the lofted surface (106).

58. The method of any of the clauses 54-57, further comprising detaching the base and re-using the base to assemble another one of the layup mandrels (e.g., a different layup mandrel).

59. The method of any of the clauses 54-68 implemented using the layup mandrel of any of the clauses 1-54.

60. The method or layup mandrel of any of the clauses 1-59, wherein example composite materials include, but are not limited to, carbon fiber, materials used in additive manufacturing or 3D printing, thermoplastics, fiberglass, carbon felt, polymers, polyamide, polyetherketone (PEK), polyether ether ketone (PEEK), polyetherketoneketone (PEKK), polyimide (PI), polyetherimide (PEI) polyphenylsulphone, or hybrid forms of the aforementioned thermoplastics with modifiers and/or inclusions such as a carbon nanotube, graphene, a clay modifier, discontinuous fibers, surfactants, stabilizers, powders and particulates.

61. The layup mandrel of any of the clauses 1-60, wherein the loft skin comprises a mesh enabling three dimensional printing or additive manufacturing of the face sheet.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A layup mandrel, comprising:
a rib structure comprising a frame and ribs defining a lofted surface; and
a skin attached to and supported by the rib structure; and
a detachable base comprising an assembly jig comprising a floating capture system for capturing the ribs during assembly of the ribs, so that the detachable base is modular for the assembly of different configurations of the ribs; and wherein:

the skin has a surface having a curvature of the lofted surface,
the ribs are disposed to at least partially shape the curvature molding a part pressed against the skin during curing of the part even when the detachable base is detached from the rib structure,
the frame comprises slots and the ribs each comprise a notch for insertion in a corresponding one of the slots, and
for each of the ribs, the notch identifies an ordering of the each of the ribs in the rib structure.

2. The layup mandrel of claim 1, wherein the floating capture system allows the ribs to float and move freely and independently during the assembly.

3. The layup mandrel of claim 1, wherein the floating capture system comprises an egg crate structure comprising movable vanes and the notches for positioning and holding the ribs during assembly of the rib structure.

4. The layup mandrel of claim 1, further comprising the detachable base comprising one or more handles for transporting or handling the layup mandrel attached to the detachable base, wherein the detachable base comprises supports running a length of the detachable base, the supports comprise attach holes and/or slots for positioning and mounting pieces running across a width of the detachable base, and the supports hold the ribs along a direction of the width.

5. The layup mandrel of claim 4, wherein the one or more handles comprise one or more openings in one or more of the supports capable of receiving at least one tool selected from:
one or more forklift forks,
one or more lifting hooks, or
one or more attachments for connecting one or more casters,
so that the detachable base is capable of being at least lifted or transported by the tool when the tool or the one or more attachments are inserted into the openings.

6. The layup mandrel of claim 4, wherein:
the frame comprises tabs, and
the tabs comprise holes for fasteners that fasten the rib structure to the detachable base along a length of the rib structure and along a cross-section of the rib structure.

7. The layup mandrel of claim 1, wherein:
the rib structure comprises or consists essentially of a composite material,
the part is an aircraft part comprising or or consisting essentially of the composite material, and
the floating capture system comprises movable vanes and/or mounts for positioning and holding the ribs during the assembly of the rib structure, so that the detachable base is modular for the assembly of different configurations of the rib structure for molding the part comprising an aircraft part comprising a wing leading edge, a wing spar, a longeron, a bulkhead, a fuselage section, and a fuselage skin.

8. The layup mandrel of claim 1, wherein:
the skin comprises a thickness from 0.003" to 0.050"; and
the skin is non-porous so that the skin has vacuum integrity when the skin is sealed to a bagging film so as to form a bag containing the part, the vacuum integrity maintaining a vacuum in the bag used for pressing the part against the skin during curing of a composite material of the part.

9. The layup mandrel of claim 1, wherein the rib structure comprises a mount supporting the ribs and the mount comprises openings allowing airflow under the skin for heat transfer during the curing.

10. The layup mandrel of claim 1, further comprising a portion of the part comprising an aircraft part comprising a composite material, wherein:
   the part comprises a face sheet and the rib structure,
   the face sheet is bonded to the surface so that the rib structure comprises an integrated stiffener for the face sheet,
   the rib structure comprises the composite material.

11. The layup mandrel of claim 1, further comprising a face sheet comprising the composite material on the skin, wherein:
   the face sheet has a second surface having the curvature of the lofted surface; and
   the curvature molds the part so that the part is pressed against the face sheet during curing of the part.

12. The layup mandrel of claim 11, wherein the surface comprises a machined surface.

13. The layup mandrel of claim 11, wherein the face sheet includes bushings or locators.

14. The layup mandrel of claim 1, wherein:
   the rib structure comprises a mount supporting the ribs,
   the ribs comprise faces and edges,
   the faces comprise cross-sectional surfaces of the rib structure,
   the edges define the lofted surface, and
   the skin is disposed on the edges.

15. The layup mandrel of claim 1, wherein the rib structure comprises a second notch holding a block having a block surface including a contour with higher resolution for molding a section of the part.

16. A method of making a layup mandrel, comprising:
   assembling, on a detachable base, a rib structure comprising a frame and ribs defining a lofted surface, wherein the detachable base comprises an assembly jig comprising a floating capture system for capturing the ribs during the assembling so that the base is modular for assembly of different configurations of the ribs; and
   attaching a skin to the rib structure so that the skin is supported by the rib structure, wherein:
   the skin has a surface having a curvature of the lofted surface;
   the ribs are disposed to at least partially shape the curvature molding a part pressed against the skin during curing of the part even when the detachable base is detached from the rib structure;
   the frame comprises slots and the ribs each comprise a notch for insertion in a corresponding one of the slots;
   for each of the ribs, the notch identifies an ordering of the each of the ribs in the rib structure; and
   the part comprises or consists essentially of a composite material.

17. The method of claim 16, further comprising allowing the ribs to float and move freely and independently during the assembling.

18. The method of claim 16, further comprising providing a face sheet on the skin, wherein:
   the face sheet has a second surface having the curvature of the lofted surface; and
   the curvature molds the part so that the part is pressed against the face sheet during curing of the part.

19. The method of claim 16, further comprising pressing the part against the skin, or a facesheet on the skin, so as to form the part.

\* \* \* \* \*